(12) United States Patent
Ramamurthy et al.

(10) Patent No.: US 11,199,887 B2
(45) Date of Patent: Dec. 14, 2021

(54) UTILITY POWER REGULATION SYSTEM USING LOCAL VOLTAGE ESTIMATION AND METHOD FOR THE SAME

(71) Applicant: Mitsubishi Electric Power Products, Inc., Warrendale, PA (US)

(72) Inventors: Shyam Sunder Ramamurthy, Pittsburgh, PA (US); Christopher Joseph Lee, Johnstown, PA (US); Michael James Fleming, Pittsburgh, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 10 days.

(21) Appl. No.: 16/773,021

(22) Filed: Jan. 27, 2020

(65) Prior Publication Data

US 2021/0232194 A1    Jul. 29, 2021

(51) Int. Cl.
| | | |
|---|---|---|
| *G05F 1/10* | (2006.01) | |
| *G06F 1/26* | (2006.01) | |
| *G05F 1/70* | (2006.01) | |
| *G05F 3/02* | (2006.01) | |

(52) U.S. Cl.
CPC .......... *G06F 1/26* (2013.01); *G05F 1/70* (2013.01); *G05F 3/02* (2013.01)

(58) Field of Classification Search
CPC ..... G06F 1/26; G05F 1/70; G05F 3/02; G05F 1/10
USPC .......................................................... 307/31
See application file for complete search history.

(56) References Cited

U.S. PATENT DOCUMENTS

| | | | |
|---|---|---|---|
| 6,069,469 A | 5/2000 | Morikawa | |
| 6,188,205 B1 | 2/2001 | Tanimoto et al. | |
| 8,427,131 B2 | 4/2013 | Bryson et al. | |
| 9,639,104 B2* | 5/2017 | Divan | G05F 3/02 |
| 9,983,613 B2* | 5/2018 | Divan | G05F 3/02 |
| 2010/0085004 A1* | 4/2010 | Bell | H02P 23/0004 318/720 |
| 2011/0309683 A1* | 12/2011 | Nielsen | H02J 3/00125 307/84 |
| 2013/0307494 A1* | 11/2013 | Meinecke | H02J 3/1878 323/205 |
| 2014/0103888 A1* | 4/2014 | Divan | G05F 3/02 323/208 |

(Continued)

FOREIGN PATENT DOCUMENTS

JP    2018-137845 A    8/2018

OTHER PUBLICATIONS

Andres E. Leon et al., "Software Sensor-Based STATCOM Control Under Unbalanced Conditions," IEEE Transactions on Power Delivery, vol. 24, No. 3, Jul. 2009, pp. 1623-1632.

*Primary Examiner* — Ryan Jager
(74) *Attorney, Agent, or Firm* — Posz Law Group, PLC

(57) ABSTRACT

A utility power regulation system includes a power converter configured to regulate one or more of a voltage and a power factor at the primary side of a step-up transformer, or at a load electrically connected to a load feeder line, based on an estimated primary-side line voltage signal. The system includes a voltage estimation circuit configured to estimate the primary-side line voltage signal from one or more signals received from a secondary-side voltage sensor, regulator line current signal, and a primary-side load feeder-line current sensor.

20 Claims, 15 Drawing Sheets

(56) References Cited

U.S. PATENT DOCUMENTS

2017/0235323 A1* 8/2017 Divan ..................... G05F 1/70
  323/208
2021/0232194 A1* 7/2021 Ramamurthy ............ G06F 1/26

* cited by examiner

UTILITY POWER REGULATION SYSTEM USING LOCAL VOLTAGE ESTIMATION AND METHOD FOR THE SAME

TECHNICAL FIELD

The subject matter described below relates generally to a utility power regulation system using local voltage estimation and method for the same. More particularly, the described subject matter relates to a system and method for regulating voltage and/or power factor on a utility power line based on locally estimating a voltage signal on the utility power line.

BACKGROUND

Utility power grids are based on large electrical generation, transmission, and distribution networks that span vast distances. Electrical generation, transmission, and distribution networks include generation stations, transmission lines, and substations that may step-up or step-down the voltage in the power grid for delivery to utility customers.

Utility power grids may also include reactive power sources to improve the voltage or the power factor of the electricity provided by a utility power grid. Examples of reactive power sources include Static Synchronous Compensators (STATCOM), field-regulated synchronous condensers, capacitor banks, and shunt reactors.

Traditionally, reactive power sources use physical voltage measurements of a regulation site, which is typically a medium or high voltage feeder bus or a load bus. With the physical voltage measurement, the reactive power source can regulate the voltage or power factor to satisfy electricity demands.

In practice, physical measurement of the voltage waveform in a utility power grid for this purpose suffers from numerous problems. The physical measurement in a utility power grid requires expensive voltage waveform sensors, such as potential transformers. Physical measurement of the voltage at the feeder level or load requires increased management of medium or high voltage interfaces. In addition, the associated equipment costs and safety procedures during maintenance and operation to avoid arc flash exposures are problematic. Furthermore, the long distance cabling for measuring the load adds additional expenses, potential for failure, and reduces accuracy of the physical measurement.

Although reactive power source systems provide effective regulation of voltage and power factor of a utility power grid, there are problems and limitations associated with the traditional measurement systems that provide room for improvement over the use of physical measurements of voltage waveforms. Moreover, estimation-based approaches also can serve as a backup method for continued operation when traditional measurements suffer from failure during operation.

SUMMARY

Accordingly, one or more embodiments provide a method for regulating utility power that includes: receiving, from a primary-side load feeder-line current sensor, a load feeder-line current signal representative of current on a load feeder line electrically connected to a primary side of a transformer; receiving, via a secondary-side voltage sensor, a secondary-side voltage signal on a secondary side of the transformer; receiving a regulator-line current signal representative of current on a power regulator line supplied by a power converter electrically connected to the secondary side of the transformer; estimating a primary-side line voltage signal on a power line at the primary side of the transformer or at a load fed through the load feeder line based on a subsystem impedance, the secondary-side voltage signal at the power converter, the load feeder-line current signal, and the regulator-line current signal of the current supplied by the power converter; and regulating, via the power converter, one or more of a power line voltage and a power factor on the power line at the primary side of the transformer or at the load electrically connected to the load feeder line based on the primary-side line voltage signal.

In one or more embodiments of the method, the estimating of the primary side line voltage signal may occur without measuring the power line voltage on the power line at the primary side of the transformer or at the load electrically connected to the load feeder line.

The subsystem impedance in one or more embodiments may be an impedance of the transformer or an impedance of a combination of the transformer and the load-feeder line.

In one or more embodiments of the method, the regulator-line current signal may be measured by a regulator-line current sensor connected to the power regulator line on the primary side or the secondary side of the transformer.

In one or more embodiments of the method, the regulator-line current signal may be estimated from a regulator reference signal.

One or more embodiments of the method may further include generating, via a phase-locked loop, a frequency and a phase of the power line voltage from the secondary side voltage signal.

In one or more embodiments of the method, the estimating of the primary-side line voltage signal may estimate an instantaneous magnitude, angle, and power factor signal of each phase of the power line voltage.

In one or more embodiments of the method, the regulating of the power line may output a signal that regulates an instantaneous magnitude, angle, and power factor of each phase of the power line voltage on the primary side of the transformer.

In one or more embodiments of the method, the estimating of the primary-side line voltage signal on the primary side of the transformer may generate a root-mean-square voltage signal, phase angle, and power factor signal of each phase of the power line voltage.

One or more embodiments of the method may further include regulating, via the power converter, the root-mean-square voltage magnitude and power factor of the power line voltage.

One or more embodiments provide a utility power regulation system that includes: a power converter configured to regulate AC voltage, power factor, or reactive power on a power line connected to a primary side of a transformer via a power regulator line, the power converter is electrically connected to a secondary side of the transformer via the power regulator line; a secondary-side voltage sensor electrically connected to the power regulator line on the secondary side of the transformer, the secondary-side voltage sensor configured to measure a secondary-side voltage signal on the secondary side of the transformer at the power converter; a primary-side load feeder-line current sensor that is electrically connected to a load feeder-line and that measures a load feeder-line current signal representative of current on the load feeder-line connected to the power line; and a voltage estimation circuit configured to estimate a primary-side line voltage signal on the power line at the primary side of the transformer or at a load fed through the load feeder line based on a subsystem impedance, the secondary-side voltage signal at the power converter, the load power feeder-line current signal, and a regulator-line current signal representative of the current supplied by the power converter, wherein the power converter is configured to regulate one or more of a voltage and a power factor at the primary side of the transformer or at a load electrically connected to the load feeder line based on the primary-side line voltage signal estimated by the voltage estimation circuit.

In one or more embodiments, the voltage estimation circuit may further be configured to estimate the primary-side line voltage signal without measuring a power line voltage on the primary side of the transformer or at the load electrically connected to the load feeder line.

In one or more embodiments, the subsystem impedance may be an impedance of the transformer or a combination of the transformer and the load-feeder line.

In one or more embodiments, the utility power regulation system may further include a regulator-line current sensor that is electrically connected to the power regulator line on the primary side or the secondary side of the transformer and that measures the regulator-line current signal.

In one or more embodiments, the utility power regulation system may further include a regulator-line current estimation circuit that estimates the regulator-line current signal from a regulator reference signal.

In one or more embodiments, the utility power regulation system may further include a phase-locked loop that is located within the power converter, that is electrically connected to the power regulator line, and that estimates a frequency and an angle of the primary-side power line voltage on the primary side of the transformer from the secondary side voltage signal.

In one or more embodiments, the voltage estimation circuit may further be configured to estimate an instantaneous magnitude, angle, and power factor signal of each phase of the primary side line voltage.

In one or more embodiments, the power converter may further be configured to regulate the instantaneous magnitude, angle, and the power factor signal of each phase of the line voltage on the primary side of the transformer.

In one or more embodiments, the voltage estimation circuit may further be configured to generate a root-mean-square voltage signal, angle, and power factor signal of each phase of the primary side line voltage.

In one or more embodiments, the power converter may further be configured regulate the root-mean-square voltage magnitude and power factor of the power line.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present disclosure.

DETAILED DESCRIPTION

The instant disclosure is provided to further explain in an enabling fashion the best modes of performing one or more embodiments. The disclosure is further offered to enhance an understanding and appreciation for the inventive principles and advantages thereof, rather than to limit in any manner the embodiments.

It is further understood that the use of relational terms, such as first and second, if any, are used to distinguish one from another entity, item, or action without necessarily requiring or implying any actual such relationship or order between such entities, items or actions. Some embodiments may include a plurality of processes or steps, which can be performed in any order unless expressly and necessarily limited to a particular order (i.e., processes or steps that are not so limited may be performed in any order).

The disclosed system is a utility power regulation system using local voltage estimation and method for the same. In general, this system and method allow utility power regulation in which, e.g., the voltage waveform is locally estimated. This allows reduction or elimination of voltage sensors (i.e., voltage waveform sensors, such as potential transformers) and long distance cabling during utility power grid regulation. Furthermore, the disclosed system reduces the problems associated with arc flash exposure, other safety concerns, maintenance costs, and sensor failures while increasing reliability and decreasing costs compared to physical sensors and wiring.

Figure 1:
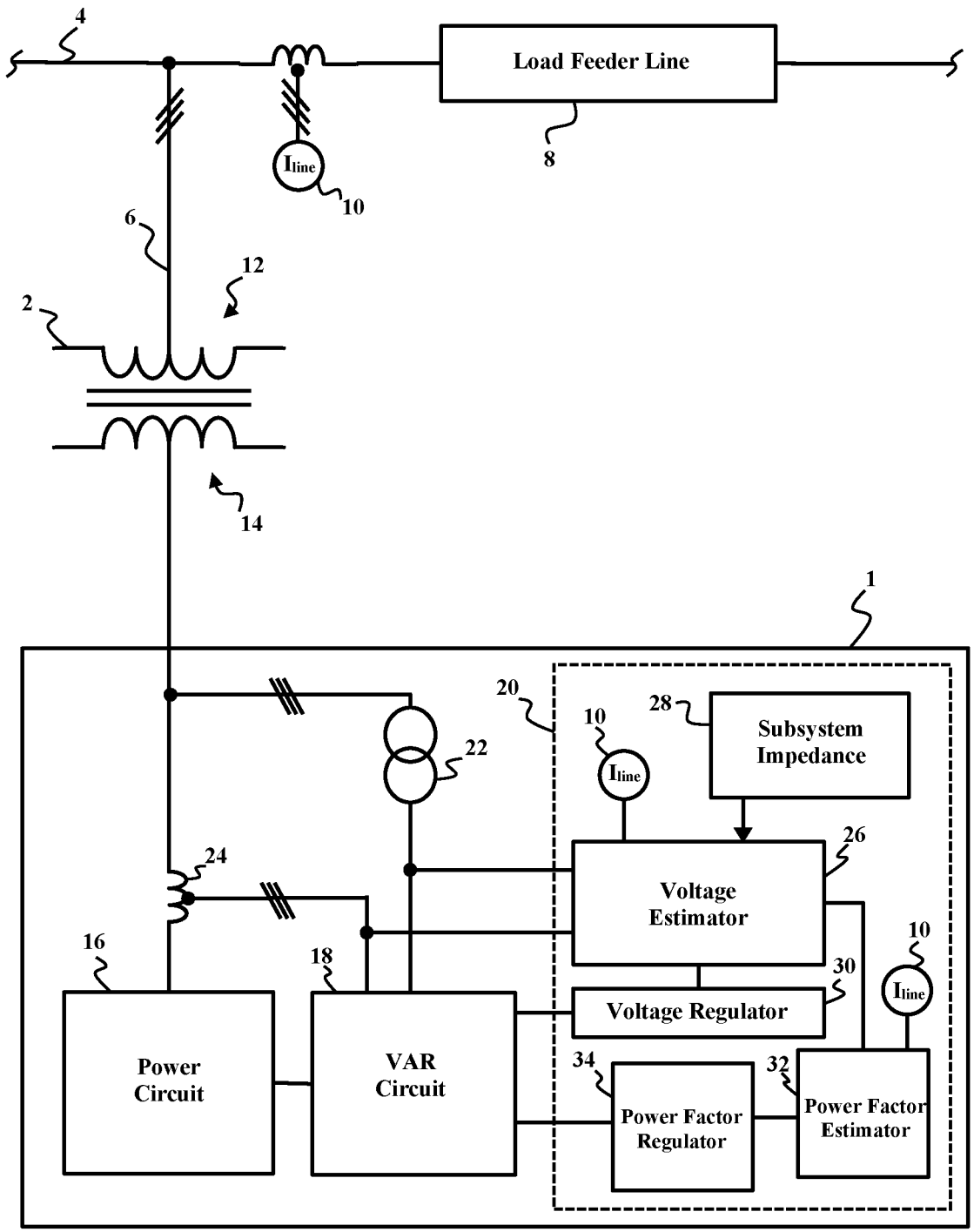
FIG. 1 is a simplified, schematic circuit diagram of a power converter with voltage waveform estimation in a utility power grid utilizing secondary regulator line current measurements according to the disclosed embodiments.
Figure 2:
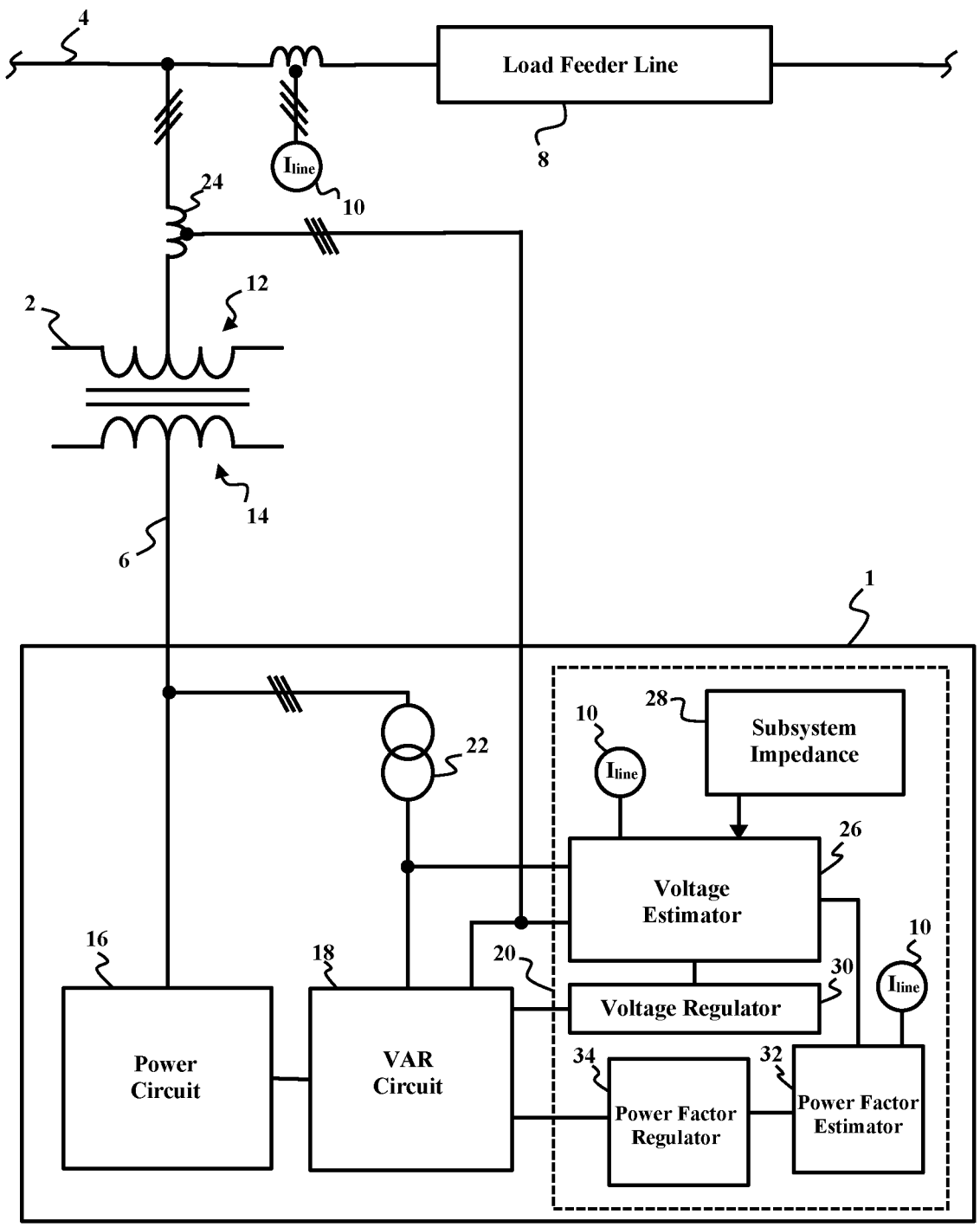
FIG. 2 is a simplified, schematic circuit diagram of a power converter with voltage waveform estimation in a utility power grid utilizing primary side regulator line currents according to the disclosed embodiments.

FIGS. 1 and 2 are simplified, schematic diagrams of a power converter 1 in a utility power grid according to disclosed embodiments. As shown in FIG. 1, the power converter 1 is connected to a step-up transformer 2. The step-up transformer 2 is connected to a power supply line 4.

The step-up transformer 2, as the name implies, steps up the voltage from the power converter 1 to the power supply line 4. In view of this, the power converter 1 can be considered to be located on a low voltage side of the step-up transformer 2 (e.g., 380 V, 480 V, or 600 V) and the power supply line 4 can be considered to be located on a high voltage side of the step-up transformer 2 (e.g., 12.47 kV, 34.5 kV, 345 kV). Although a step-up transformer 2 is discussed, other types of transformers are applicable to one or more embodiments as will be understood by one skilled in the art.

A regulator line 6 connects the step-up transformer 2 to the power converter 1 and the power supply line 4. The power supply line 4 is connected to a load feeder line 8. The load feeder line 8 delivers the high voltage to a subsequent point in the distribution or transmission network of a utility power grid, such as a load connected to an output of the load feeder line 8. The load may be another distribution station that may step down the voltage for utility customers. The load feeder line 8 includes a load feeder line current sensor 10, such as a current transformer.

The power supply line 4 is located on the high voltage side of the step-up transformer 2, as discussed above. The high voltage side of the step-up transformer 2 is referred to as the primary side 12. On the other hand, the power converter 1 is located on the low voltage side of the step-up transformer 2. The low voltage side of the step-up transformer 2 is referred to as the secondary side 14.

The power converter 1 includes a power circuit 16, a voltage-ampere reactive control circuit 18 ("VAR circuit"), and a controller 20. The power circuit 16 may include one or more power electronics or power electronic systems, such as power semiconductor transistors, thyristors, inductors, capacitors, and resistors. The VAR circuit 18 may include analog, digital, or software implementation of a phase-locked loop ("PLL") and current regulators to control the currents and power to a value received from a reference command.

The power converter 1 is an alternating current regulation device that can provide active and reactive power to an electricity transmission or distribution system. An example of a power converter is a Static Synchronous Compensator (STATCOM), a photovoltaic converter, or a battery energy storage system.

The power converter 1 of FIG. 1 also includes a secondary-side voltage sensor 22, such as a voltage transformer or a potential transformer. FIG. 1 also shows that the power converter 1 includes a regulator-line current sensor 24, such as a current transformer. The regulator-line current sensor 24 measures the current on the regulator line 6.

Although FIG. 1 shows the regulator-line current sensor 24 as a component of the power converter 1 itself (i.e., within the power converter 1), the regulator-line current sensor 24 can be located at any position to measure the current on regulator line 6. Thus, the regulator-line current sensor 24 is not limited to being located inside of the power converter 1. Instead, the regulator-line current sensor 24 can be located at any point on the regulator line 6.

For example, FIG. 2 shows a regulator-line current sensor 24 located outside of the power converter 1. In particular, FIG. 2 shows that the regulator-line current sensor 24 can be located on the primary side 12 of the step-up transformer 2.

As shown in FIG. 1, the controller 20 includes a voltage estimator 26 that estimates the voltage waveform on the primary side 12 of the step-up transformer 2. The voltage estimator 26 estimates a voltage signal on the high voltage side of the step-up transformer 2 from the signals provided by the secondary-side voltage sensor 22, the regulator-line current sensor 24, the load feeder line current sensor 10 based on a subsystem impedance 28.

The subsystem impedance 28 is predetermined and stored within the controller 20 on, e.g., memory as shown in FIGS. 1 and 2. The subsystem impedance 28 may be the impedance of the step-up transformer 2 or the impedance of both the step-up transformer 2 and the load feeder line 8. Which impedance the voltage estimator 26 applies is based on the point of regulation estimated by the voltage estimator 26. Furthermore, the subsystem impedance 28 includes the effects of the operation of the power converter 1.

For example, when the voltage estimator 26 estimates the voltage signal at the primary side 12 of the step-up transformer 2 (i.e., at a node before the load feeder line 8), the voltage estimator 26 estimates the voltage signal based on the impedance voltage of the step-up transformer 2 caused by the power converter 1 as the subsystem impedance 28.

When the voltage estimator 26 estimates the voltage signal at a load connected to the load feeder line 8 (i.e., at a node after both the step-up transformer 2 and the load feeder line 8), the voltage estimator 26 estimates the voltage signal based on the impedance voltage of both the step-up transformer 2 and the load feeder line 8 caused by the power converter 1 as the subsystem impedance 28.

The controller 20 also includes a voltage regulator 30 that regulates the voltage on the primary side 12 based on the estimated voltage signal on the primary side 12 provided by the voltage estimator 26.

With the estimated voltage signal provided by the voltage estimator 26, the controller 20 can also estimate the power factor on the primary side 12. In particular, the controller includes a power factor estimator 32. The power factor estimator 32 uses the estimated voltage signal on the high voltage side of the step-up transformer 2 to estimate the power factor on the high voltage side of the step-up transformer 2.

After estimating the power factor, power converter 1 can also regulate the power factor on the high voltage side of the step-up transformer. In particular, FIGS. 1 and 2 show that the controller 20 includes a power factor regulator 34.

The regulation provided by the voltage regulator 30 and the power factor regulator 34 can be performed based on a feedback control loop. Examples of the feedback control provided by the voltage regulator 30 and the power factor regulator 34 are discussed in greater detail further below.

The voltage estimator 26 may be a voltage estimation circuit, the voltage regulator 30 may be a voltage regulation circuit, the power factor estimator 32 may be a power factor estimation circuit, and the power factor regulator 34 may be a power factor regulator circuit 34. Control diagram for these circuits are discussed further below.

Figure 3:
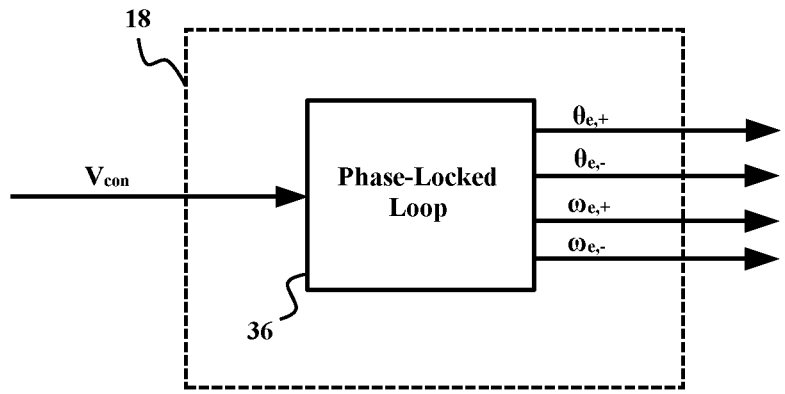
FIG. 3 is a schematic diagram of a phase-locked loop of the power converter according to the disclosed embodiments.

In FIGS. 1 and 2, the voltage estimator 26 is configured to estimate the voltage on the primary side 12 of the step-up transformer 2 without physical measurements of the voltage signal at the point of regulation. To perform this estimation, the voltage estimator 26 may also use signals provided by a phase-locked loop 36, as shown in FIG. 3.

The phase-locked loop 36 is a control system that is locked with the angle of the power supply line 4 and outputs one or more signals that include the positive and negative sequences of a phase and frequency that corresponds to the point of regulation on the high voltage side of the step-up transformer 2. The phase-locked loop 36 may be analog, digital, or software implemented. The phase-locked loop 36 may include, e.g., a phase comparator, a loop filter, and a voltage controlled oscillator. FIG. 3 shows a block diagram representation of the phase-locked loop 36. Although the phase-locked loop 36 is shown as a part of the VAR circuit 18 in FIG. 3, the phase-locked loop 36 can be a part of other components of the power converter 1 or other systems outside the power converter 1.

The phase-locked loop 36 receives a voltage signal that represents the voltage signal at the terminals of the power converter 1 on the low voltage side of the step-up transformer 2 (e.g., at the secondary side 14). This low voltage signal is referred to as a secondary-side voltage signal, and is provided to the phase-locked loop 36 by the secondary-side voltage sensor 22 as shown in FIGS. 1 and 2 (e.g., a potential transformer).

The secondary-side voltage signal is generically referred to as $V_{CON}$ in the drawings. The secondary-side voltage signal is measured in the UVW reference frame. The secondary-side voltage signal in the voltage estimator 26 may be two of the three components of the secondary-side voltage signal (e.g., $V_{UV}$, $V_{UW}$, etc.) or all three components of the secondary-side voltage signal (i.e., $V_{UVW}$, line-to-line, or line-to-neutral) may also be provided in the secondary-side voltage signal.

The secondary-side voltage signal may include the positive and negative sequence voltages ("sequence voltages"). The sequence voltages are represented in the figures with the subscript "S" (e.g., $V_{CON,S}$). FIG. 3 shows that the phase-locked loop 36 outputs one or more signals that includes the positive and negative components of the angle of the estimated voltage (shown as $\theta_{c,+}$ and $\theta_{c,-}$) and the positive and negative components of the frequency in rad/s (shown as $\omega_{c,+}$ and $\omega_{c,-}$). In addition to the positive and negative sequence components, zero sequence component may be considered in one or more embodiments, such as a when a particular system uses standard zero sequence circuit handling.

Figure 4:
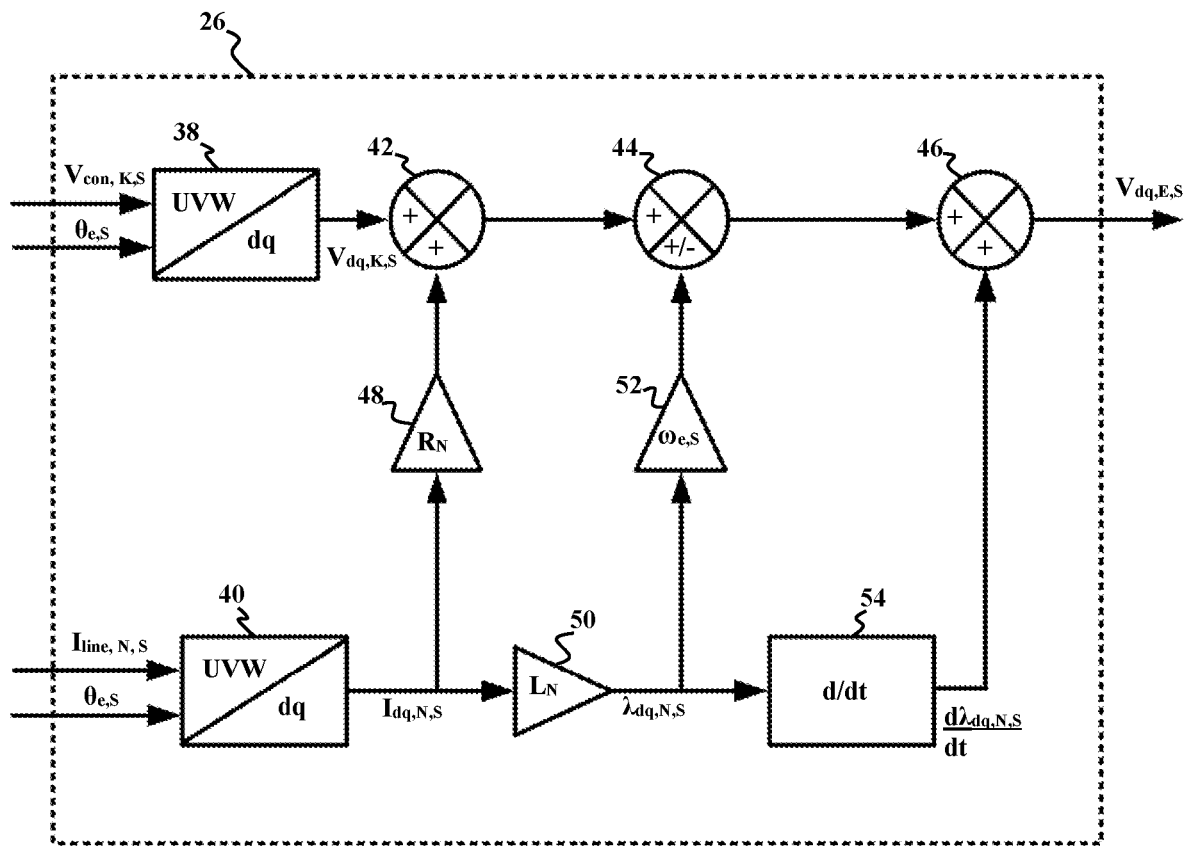
FIG. 4 is a control diagram a voltage estimator of the power converter with instantaneous voltage estimation according to disclosed embodiments.

With the output signals of the phase-locked loop 36 along with other inputs discussed above, the voltage estimator 26 can estimate the high voltage signal on the power supply line 4 without physical measurements of the high voltage by, e.g., a potential transformer. For example, a control diagram for the voltage estimator 26 is shown in FIG. 4. Advantageously, the voltage estimator 26 can estimate both the positive and negative sequence voltages of the voltage on the primary side 12 of the step-up transformer 2 based on the control diagram as shown in FIG. 4.

In the figures, the subscript "N" represents the impedance of the subsystem that is used to estimate the voltage signal at the point of regulation. As noted above, the point of regulation on the power supply line 4 can be, e.g., on the primary side 12 of the step-up transformer 2 for which the subsystem is the step-up transformer 2. The point of regulation can also be at a load connected to the load feeder line 8 for which the subsystem is the load feeder line 8. The subscript "K" represents a signal that is known (i.e., has been measured by a sensor, such as the secondary-side voltage sensor 22). The subscript "E" represents the point of regulation being estimated, such as at the primary side 12 of the step-up transformer or at a load connected to the load feeder line 8.

FIG. 4 shows a voltage estimator 26 with an instantaneous voltage estimation control circuit. As shown in control diagram of FIG. 4, the voltage estimator 26 includes one or more direct-quadrature-zero frame converters ("dq frame converters"). The dq frame converters perform a direct-quadrature-zero transformation of a signal in the UVW reference frame (sometimes referred to by those skilled in the art as ABC reference frame) into the direct-quadrature-zero frame ("dq frame"). To perform the conversion of this signal, the dq frame converter performs a Park transformation. The dq frame converter may also perform a Clark transformation in combination with the Park transformation.

As shown in FIG. 4, the voltage estimator 26 includes a first dq-frame converter 38 and a second dq-frame converter 40. The first dq-frame converter 38 receives the secondary-side voltage signal in the UVW reference frame ($V_{con,K}$) from the secondary-side voltage sensor 22 and the angle of the estimated voltage on the secondary side 14 ($\theta_{c,K}$) from the phase-locked loop 36.

As noted above, the control logic of the voltage estimator 26 can advantageously estimate the positive and negative sequences of the voltage on the secondary side 14. As noted above, positive and negative sequences are generically referred to in the figures as the subscript "S."

The first dq-frame converter 38 converts the secondary-side voltage signal into the dq frame, which is represented by $V_{dq,K,S}$. The dq-frame voltage signal $V_{dq,K,S}$ is fed into a first mixer 42. The second dq-frame converter 40 receives the load feeder-line current signal from the regulator-line current sensor 24 in the UVW frame ($I_{line}$) (i.e., one or more components of the UVW frame, such as $I_U$, $I_V$, or $I_{UVW}$) and the angle of the estimated voltage on the secondary side 14 ($\theta_{e,S}$).

Like the first dq-frame converter 38, the second dq-frame converter 40 can convert either the positive or negative sequences of the load feeder-line current signal ($I_{line,N,S}$) and the phase of the estimated voltage on the secondary side 14 ($\theta_{e,S}$) into the dq-frame. The dq-frame current signal is represented as $I_{dq,N,S}$ in the figures.

The voltage estimator 26 then multiplies the dq-frame current $I_{dq,N,S}$ by a first gain 48 of the resistance of the subsystem being estimated ($R_N$) and a second gain 50 of the inductance of the subsystem being estimated ($L_N$). The resistance and inductance gains represent the impedance of the subsystem. The subsystem can be, for example, the step-up transformer 2 or the load feeder line 8.

Next, the voltage estimator 26 feeds the output signal from the first gain 48 into the first mixer 42. The output from the second gain 50 is the flux linkage of the subsystem in the dq-frame, and the flux linkage is represented by $\lambda_{dq,N,S}$. The dq-frame flux linkage of the subsystem $\lambda_{dq,N,S}$ is multiplied by a third gain 52 of the estimated frequency ($\omega_{e,S}$) in rad/s output by the phase-locked loop 36. The frequency output by the phase locked loop 36 can be the positive or negative sequence depending on the input, and thus is represented by $\omega_{e,S}$.

The voltage estimator 26 then feeds the output of the first mixer 42 and the output of the third gain 52 into a second mixer 44. The input received from the third gain 52 will be added or subtracted depending on whether the sequence S is positive or negative, respectively.

The voltage estimator 26 takes the derivative of the dq-frame flux linkage of the subsystem $\lambda_{dq,N,S}$, as shown by the derivative block 54. The result of the derivative of the dq-frame flux linkage of the subsystem $\lambda_{dq,N,S}$ is shown in FIG. 4 as $d\lambda_{dq,N,S}/dt$. The derivative of the dq-frame flux linkage of the subsystem $d\lambda_{dq,N,S}/dt$ from the derivative block 54 and the output from the second mixer 44 are fed into a third mixer 46. The output from the third mixer 46 provides the estimated high voltage signal in the dq-frame, which is shown in FIG. 4 as $V_{dq,E,S}$.

With this configuration, the voltage estimator 26 can estimate the voltage at the regulation point on the high voltage side of the step-up transformer 2 without a voltage waveform sensor (e.g., a potential transformer).

Furthermore, the control diagram of FIG. 4 provides an instantaneous estimation of the magnitude and angle at the regulation point. This approach improves over the disadvantages that occur when physical measurements are used for the high voltage, as discussed above (e.g., inaccuracies due to losses in the cabling, expensive components and maintenance, safety issues, etc.). Furthermore, the voltage estimation of the present disclosure provides a real-time estimation of the high voltage on the power supply line 4 at the point of regulation.

As noted above, the subsystem impedance that is used to determine the voltage on the primary side 12 can be the step-up transformer 2 or the load feeder line 8. The impedance used to determine the regulation point is dependent upon whether the subsystem is the step-up transformer 2 or the combination of the step-up transformer 2 and the load feeder line 8 (e.g., whether the point of regulation is before or after the load feeder line 8 on the power supply line 4).

Figure 5:
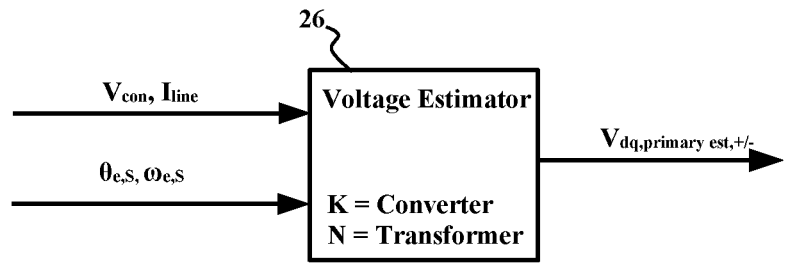
FIG. 5 is a block diagram of the voltage estimator of FIG. 4 according to disclosed embodiments.
Figure 6:
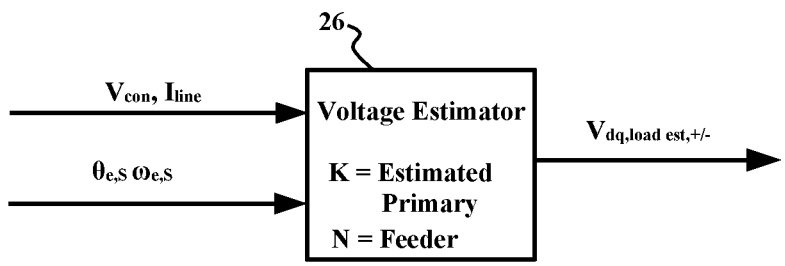
FIG. 6 is a block diagram of the voltage estimator of FIG. 4 according to disclosed embodiments.

The voltage estimators 26 of FIGS. 5 and 6 include the same inputs of $V_{CON}$ and $I_{LINE}$, which are provided by the secondary-side voltage sensor 22 and the load feeder line current sensor 10. FIGS. 5 and 6 show the outputs of the voltage estimator 26 depending on the subsystem impedance being used for the estimation. This is also reflected in the inputs in FIGS. 5 and 6 of the angle ($\theta_{e,S}$) and frequency ($\omega_{e,S}$) from the phase-locked loop 36.

For example, when the subsystem is the step-up transformer 2, the voltage estimator 26 estimates the high voltage signal on the primary side 12 of the step-up transformer 2 at a node on the power supply line 4 before the load feeder line 8.

FIG. 5 shows an example of the voltage estimator 26 when the subsystem is the step-up transformer 2, and the output of the voltage estimator 26 in FIG. 5 is the dq-frame estimated voltage at a node on the primary side 12 of the step-up transformer 2. The output of the voltage estimator 26 can be positive or negative sequences, which is shown as $V_{dq\ primary\ est,\ +/-}$ in FIG. 5.

On the other hand, when the subsystem is the load feeder line 8 and the step-up transformer 2, the voltage estimator 26 estimates the high voltage signal on the power supply line 4 at the load (e.g., a load connected to the load feeder line 8) as the point of regulation.

FIG. 6 shows an example of when the subsystem is both the step-up transformer 2 and the load feeder line 8 and the high voltage signal at the load is being estimated as the point of regulation. The estimated load voltage at the output of the voltage estimator 26 in FIG. 6 is represented by $V_{dq,load\ est,+/-}$. The estimated load voltage $V_{dq,load\ est,+/-}$ is in the dq-frame.

Figure 7:
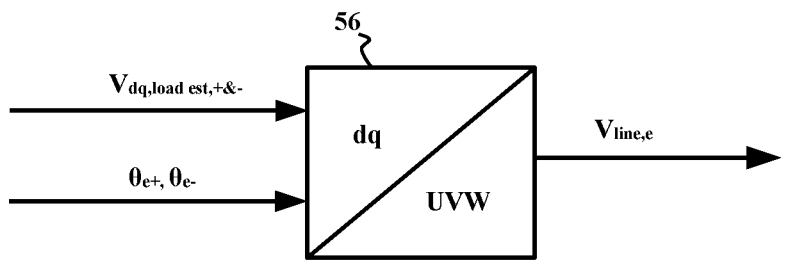
FIG. 7 is a block diagram of the direct-quadrature reference frame converter according to disclosed embodiments.

The estimated load voltage $V_{dq,load\ est,+/-}$ and can be converted into the UVW reference frame through a third dq-frame converter 56, as shown in FIG. 7. The third dq-frame converter 56 performs a dq-frame to UVW conversion using inverse Park and/or Clark transforms, as discussed above with reference to the first dq-frame converter 38 and the second dq-frame converter 40.

Figure 8:
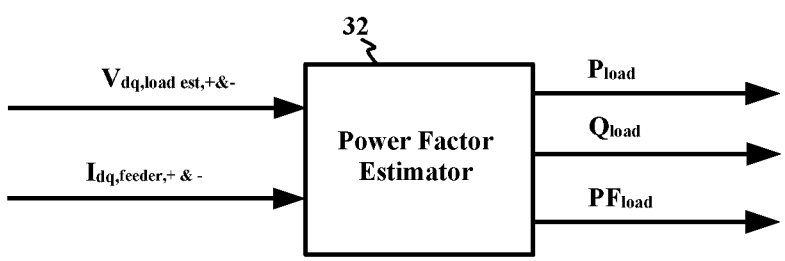
FIG. 8 is a block diagram of the power factor estimator according to disclosed embodiments.

With the estimated voltage at the load, the controller 20 of the power converter 1 can estimate the power factor at the load connected to the load feeder line 8. For example, FIG. 8 shows the power factor estimator 32, which receives the positive and negative sequences of the estimated load voltage $V_{dq,load\ est,+/-}$ is in the dq-frame as well as the load feeder-line current signal from the load feeder line current sensor 10.

With these inputs, the power factor estimator 32 then estimates the active power at the load $P_{load}$, the reactive power at the load $Q_{load}$, and the power factor at the load $PF_{load}$. The power factor estimator 32 outputs these signals to the power factor regulator 34, as discussed in greater detail below, in order to regulate these aspects at the regulation point without physical measurements of the voltage at the regulation point.

Figure 9:
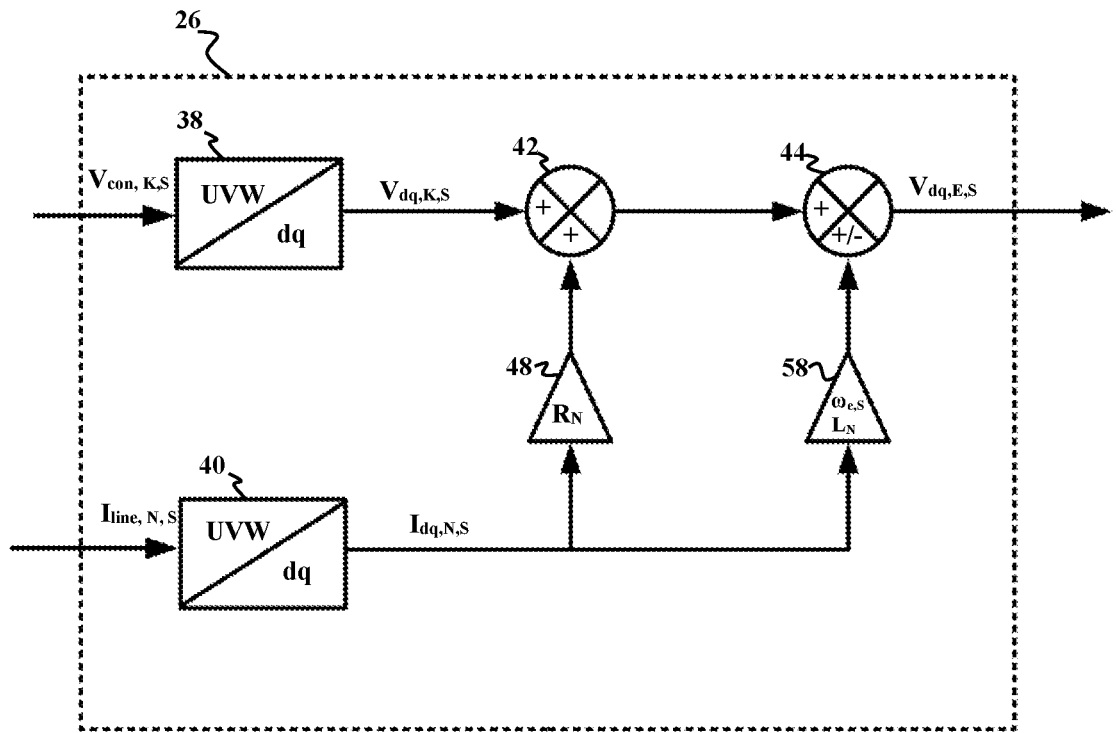
FIG. 9 is a control diagram a voltage estimator of the power converter according to disclosed embodiments.

FIG. 4 shows that the voltage estimator 26 may perform an instantaneous estimation of the magnitude and angle of the voltage at the regulation point. The voltage estimator 26 may also perform a root-mean-square ("RMS") voltage estimation at the regulation point on the power supply line 4. FIG. 9 shows a control diagram of the voltage estimator 26 in which the voltage estimator 26 estimates an RMS voltage signal, which represents the estimated RMS voltage at the point of regulation.

In FIG. 9, the voltage estimator 26 receives an RMS secondary side voltage ($V_{CON,K,S}$) and an RMS regulator line current ($I_{LINE,N,S}$) from the low voltage side of the step-up transformer from the secondary-side voltage sensor 22 and the regulator-line current sensor 24, respectively. The RMS secondary side voltage and the RMS regulator line current can be positive or negative sequences, which is represented by the subscript "S" as discussed above. The voltage estimator 26 of FIG. 9 includes a first dq-frame converter 38 and a second dq-frame converter 40, as similarly discussed above with reference to FIG. 4.

The outputs of the first dq-frame converter 38 and the second dq-frame converter 40 are shown as the dq-frame RMS voltage $V_{dq,K,S}$ and the dq-frame RMS current $I_{dq,N,S}$. These values are the RMS values along the direct and quadrature axis in which the Q-axis aligned to the U-phase or in quadrature, respectively.

The voltage estimator 26 multiplies the output of the second dq-frame converter 40 by a first gain 48 and a fourth gain 58. As with FIG. 4, the first gain 48 represents the resistance of the subsystem used to estimate the voltage (e.g., the impedance of the step-up transformer 2 or the combined impedance of the step-up transformer and the load feeder line 8). The output of the first dq-frame converter 38 and the first gain 48 in FIG. 9 are then fed into a first mixer 42.

The fourth gain 58 represents the inductance of the subsystem ($L_N$) and the estimated frequency (rad/s) output by the phase-locked loop 36. The frequency output by the phase-locked loop 36 can be the positive or negative sequence, and thus is represented by $\omega_{e,S}$. The fourth gain 58 in FIG. 9 can symbolically be considered the combination of the second gain 50 and the third gain 52 from FIG. 4. Consequently, the fourth gain 58 could be represented as two separate gains as the second gain 50 and the third gain 52.

The output of the fourth gain 58 and the first mixer 42 are fed into the second mixer 44 of FIG. 9. As shown, the output of the fourth gain 58 may be added or subtracted by the second mixer depending on whether the sequences are positive or negative, respectively.

The second mixer 44 of FIG. 9 then outputs the estimated RMS voltage $V_{dq,E,S}$ at the regulation point. As with the instantaneous voltage estimation in FIG. 4, the regulation point is dependent on which subsystem impedance is applied for the estimation.

For example, if the subsystem impedance is the impedance of the step-up transformer 2, then the regulation point is located on the power supply line 4 at the primary side 12 of the step-up transformer 2 (at a node before the load feeder line 8). On the other hand, if the subsystem impedance is the impedance of both the step-up transformer 2 and the load feeder line 8, then the regulation point is at the load (e.g., a load connected to the load feeder line 8).

Figure 10:
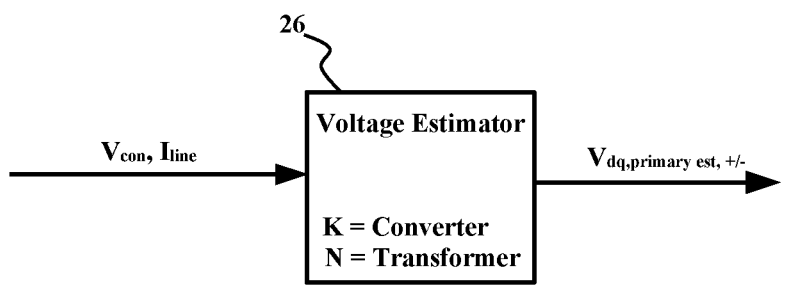
FIG. 10 is a block diagram of the voltage estimator of FIG. 9 according to disclosed embodiments.
Figure 11:
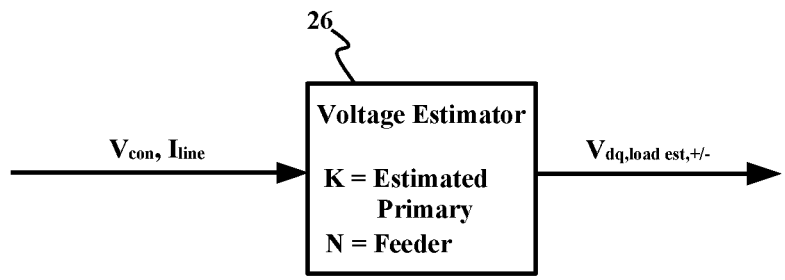
FIG. 11 is a block diagram of the voltage estimator of FIG. 9 according to disclosed embodiments.

As with FIGS. 5 and 6, FIGS. 10 and 11 show examples of this feature in which the outputs of the voltage estimator 26 depends on the subsystem impedance being used for the estimation. FIGS. 10 and 11 are the RMS representation of FIGS. 5 and 6.

For example, FIG. 10 shows that the voltage estimator 26 outputs the RMS voltage in the dq-frame at the primary side 12 of the step-up transformer when the subsystem is the step-up transformer. In particular, FIG. 10 shows that the voltage estimator 26 with the control diagram of FIG. 9 receives the RMS secondary side voltage $V_{CON}$ and the RMS regulator line current $I_{LINE}$, the voltage estimator 26 estimates (outputs) an RMS voltage signal on the primary side 12 of the step-up transformer 2 (at a node before the load feeder line 8). This RMS voltage signal is represented as $V_{dq,primary}$. Depending on whether the input to the voltage estimator 26 is a positive sequence or a negative sequence, the voltage estimator 26 will output the positive sequence or the negative sequence of the RMS voltage. This is represented as $V_{dq,primary,+/-}$.

On the other hand, when the subsystem impedance is both the step-up transformer 2 and the load feeder line 8, the estimated voltage signal includes the RMS voltage of the load as the regulation point. As shown in FIG. 11, the voltage estimator 26 with the control diagram of FIG. 6 will estimate the RMS voltage of the load in the dq-frame, which is represented at as $V_{dq,load\ est,+/-}$ from the RMS secondary side voltage $V_{CON}$ and the RMS regulator line current $I_{LINE}$.

Figure 12:
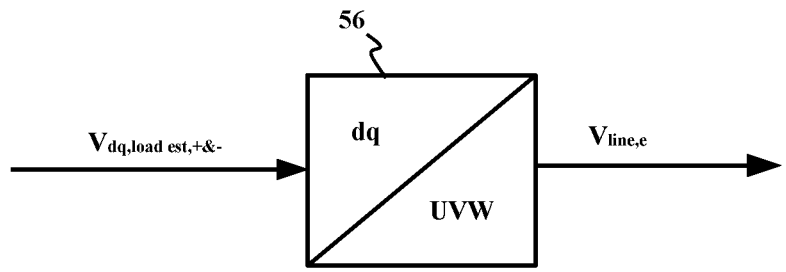
FIG. 12 is a block diagram of the direct-quadrature reference frame converter of FIG. 9 according to disclosed embodiments.

FIG. 12 shows that the RMS voltage of the load in the dq-frame can be converted into the UVW frame through the third dq-frame converter 56. As noted about, the conversion from the dq-frame to the UVW-frame is based on an inverse Park and/or Clark transformation.

Figure 13:
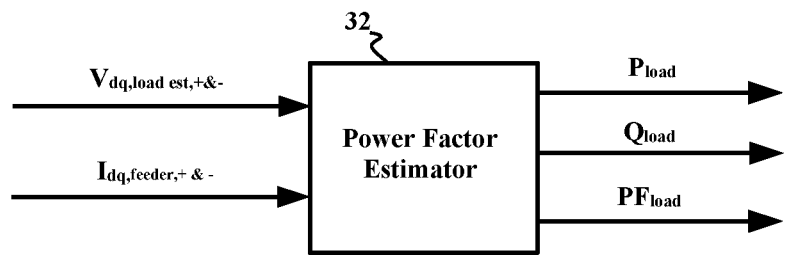
FIG. 13 is a block diagram of the power factor estimator according to disclosed embodiments.

With the estimated load voltage, the power converter 1 can estimate the power factor of the load $PF_{load}$, active power of the load $P_{load}$, and reactive power of the load $Q_{load}$ based on the positive and negative sequences of the estimated load voltage $V_{dq,load\ est,+\&-}$ from the voltage estimator 26 and the load feeder-line current signal $I_{dq,feeder,+\&I}$ provided by the load feeder line current sensor 10. FIG. 13 shows a block diagram of the power factor estimator 32, which is similar to the power factor estimator in FIG. 8.

Although FIGS. 10-13 do not show the angle and frequency input signals from the phase-locked loop 36 shown in FIGS. 5-7, one or more embodiments can also receive the angle and frequency input signals from the phase-locked loop 36 as shown in FIGS. 5-7.

With the estimated voltage and power factor signals, the controller 20 can perform voltage regulation and power factor regulation on the high voltage side of the step-up transformer even without performing a physical measurement of the high voltage at the regulation point. This regulation is represented by the voltage regulator 30 and the power factor regulator 34 in FIGS. 14 and 15, which are a part the controller 20 in FIGS. 1 and 2.

Figure 14:
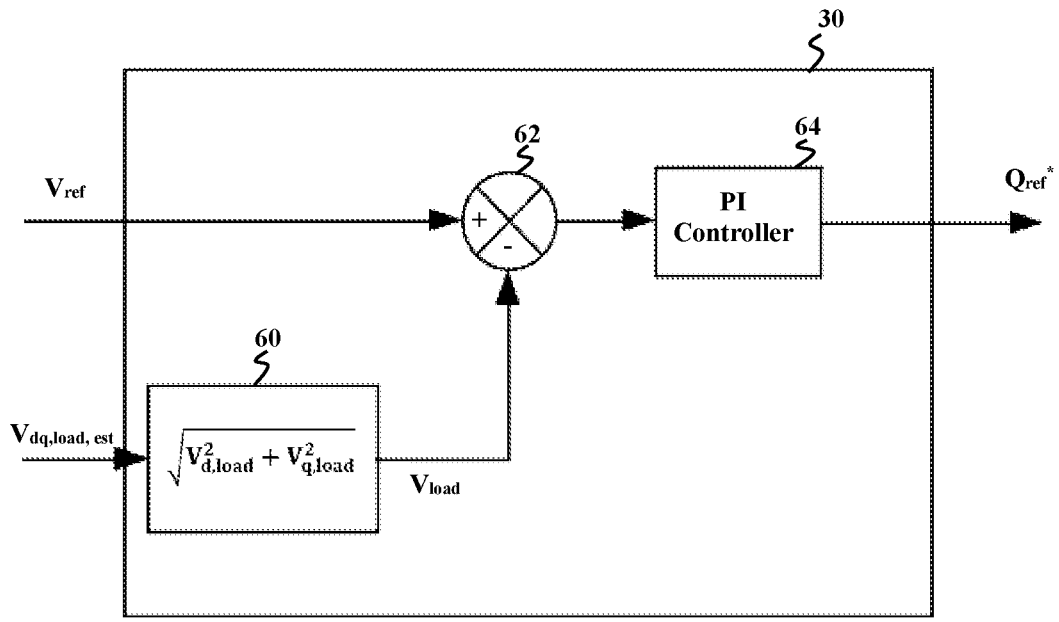
FIG. 14 is a control diagram of a voltage regulator of the power converter according to disclosed embodiments.
Figure 15:
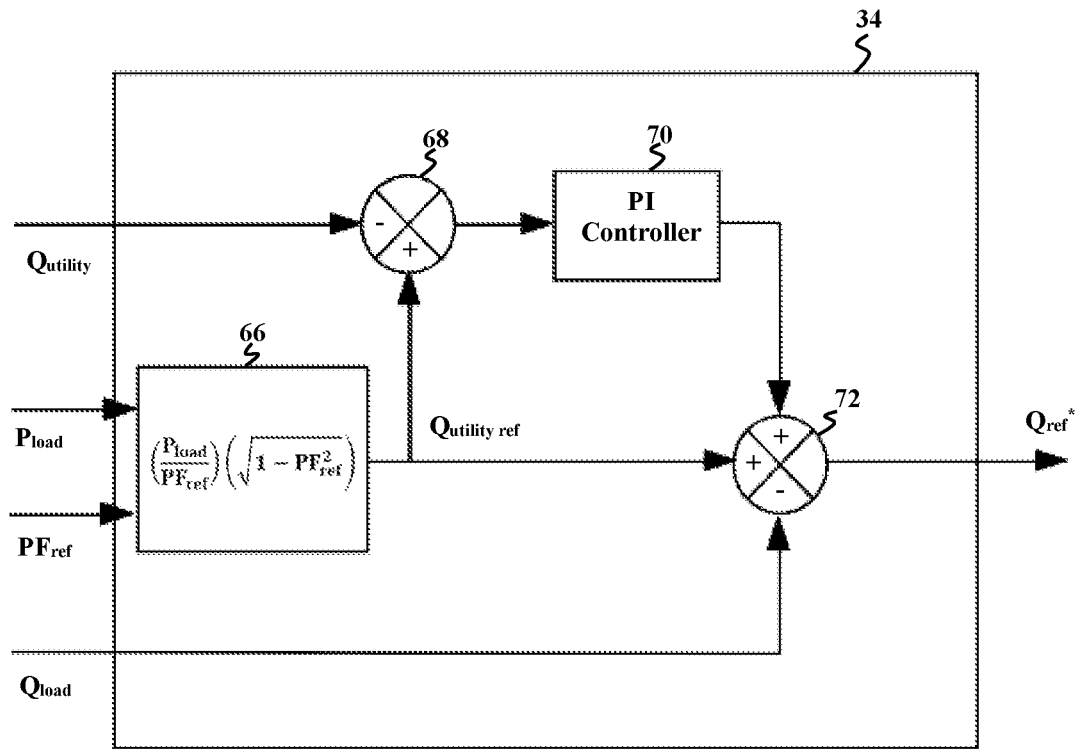
FIG. 15 is a control diagram of a power factor regulator of the power converter according to disclosed embodiments.

FIGS. 14 and 15 show control diagrams of the voltage regulator 30 and the power factor regulator 34. The voltage regulator 30 of FIG. 14 and the power factor regulator 34 of FIG. 15 perform feedback control based on reference signals and proportional-integral controllers ("PI controllers"). A PI controller performs a feedback control loop. Reference signals to, e.g., initiate base line regulation may be provided by a communication line, a supervisory control and data acquisition ("SCADA") system, or the internal memory of the controller 20.

As shown in FIG. 14, the voltage regulator 30 receives a reference voltage $V_{ref}$ and the estimated voltage at the load connected to the load feeder line 8 in the dq-frame, $V_{dq,load}$, which was estimated by the voltage estimator 26 as described above.

The estimated load voltage in FIG. 14 was based on a subsystem impedance of both the step-up transformer 2 and the load feeder line 8. Alternatively, the estimated voltage may also be the estimated voltage at the primary side 12 of the step-up transformer 2 (i.e., at a node before the load feeder line 8).

From the estimated load voltage $V_{dq,load}$, the voltage regulator 30 determines the absolute magnitude of the load voltage $V_{load}$ when the $V_{dq,load}$ is fed into the voltage magnitude computation block 60 based on Equation 1 ("Eq. 1") below:

$$\sqrt{V_{d,load}^2 + V_{q,load}^2} \qquad \text{(Eq. 1)}$$

In Equation 1 above, $V_{d,load}$ represents the direct component and $V_{q,load}$ represents the quadrature component of estimated load voltage $V_{dq,load}$ in the dq-frame.

The output of the load voltage $V_{load}$ is fed into a first feedback mixer 62 along with the input reference voltage $V_{ref}$. The output from the first feedback mixer 62 is fed into a first PI controller 64, which performs proportional-integral feedback control. The first PI controller 64 outputs a voltage reference signal. The voltage regulator 30 sends the voltage reference signal as a reactive power reference signal $Q_{ref}^*$ to the VAR circuit 18.

FIG. 15 shows a control diagram for the power factor regulator 34. The power factor regulator 34 receives a reference signal representing the reactive power on the power supply line 4 before the power converter 1, $Q_{utility}$. The power factor regulator 34 also receives a signal representing the reactive power at the load, $Q_{load}$, a signal representing the power factor at the load, $P_{load}$, and a power factor reference signal, $PF_{ref}$.

With these inputs, the power factor at the load $P_{load}$ and the power factor reference signal $PF_{ref}$ are fed into a reactive power reference signal computation block 66. The reactive power reference signal computation block 66 performs the following computation as shown in Equation 2 ("Eq. 2") to the determine a reactive power reference signal for the reactive power before the power converter 1 on the power supply line 1:

$$\left(\frac{P_{load}}{PF_{ref}}\right)\left(\sqrt{1 - PF_{ref}^2}\right) \quad \text{(Eq. 1)}$$

The reactive power reference signal computation block 66 outputs the reactive power reference signal $Q_{utility\ ref}$ to a second feedback mixer 68. The second feedback mixer 68 subtracts the reactive power on the power supply line 4, $Q_{utility}$, from the computed reactive power reference signal $Q_{utility\ ref}$. The second feedback mixer 68 outputs the difference signal to a second PI controller. The second PI controller outputs a PI controlled signal to a third feedback mixer 72, which also recites the signal representing the reactive power at the load $Q_{load}$ and the calculated reactive power reference $Q_{signal\ ref}$. The third feedback mixer 72 sends an output reactive power reference signal $Q_{ref}^*$ to the VAR circuit 18 for regulation of the power factor.

In one or more embodiments, the controller 20 of the power converter 1 may also estimate the regulator-line current signal from one or more reference signals, such as the reactive power reference signal $Q_{ref}^*$ of the voltage regulator 30 or the power factor regulator 34 and a voltage reference signal $V_{ref}^*$ in the dq-frame, as discussed above. The voltage reference signal $V_{ref}^*$ may, for example, correspond to the reference voltage $V_{ref}$ input into the voltage regulator 30 in FIG. 14, the secondary-side voltage signal $V_{con}$, or another voltage reference signal. The reference signals may be generated by one or more components of the power converter 1 or the controller 20.

Figure 16:
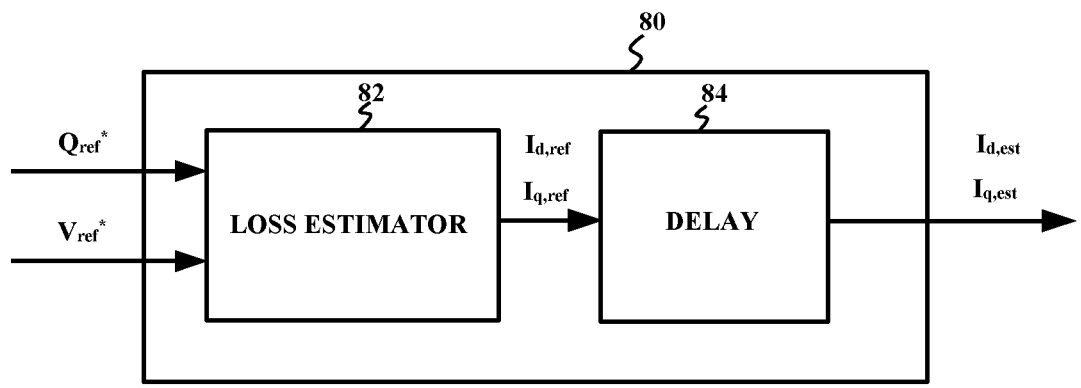
FIG. 16 is a control diagram of a regulator-line current estimator of the power converter according to disclosed embodiments.
Figure 17:
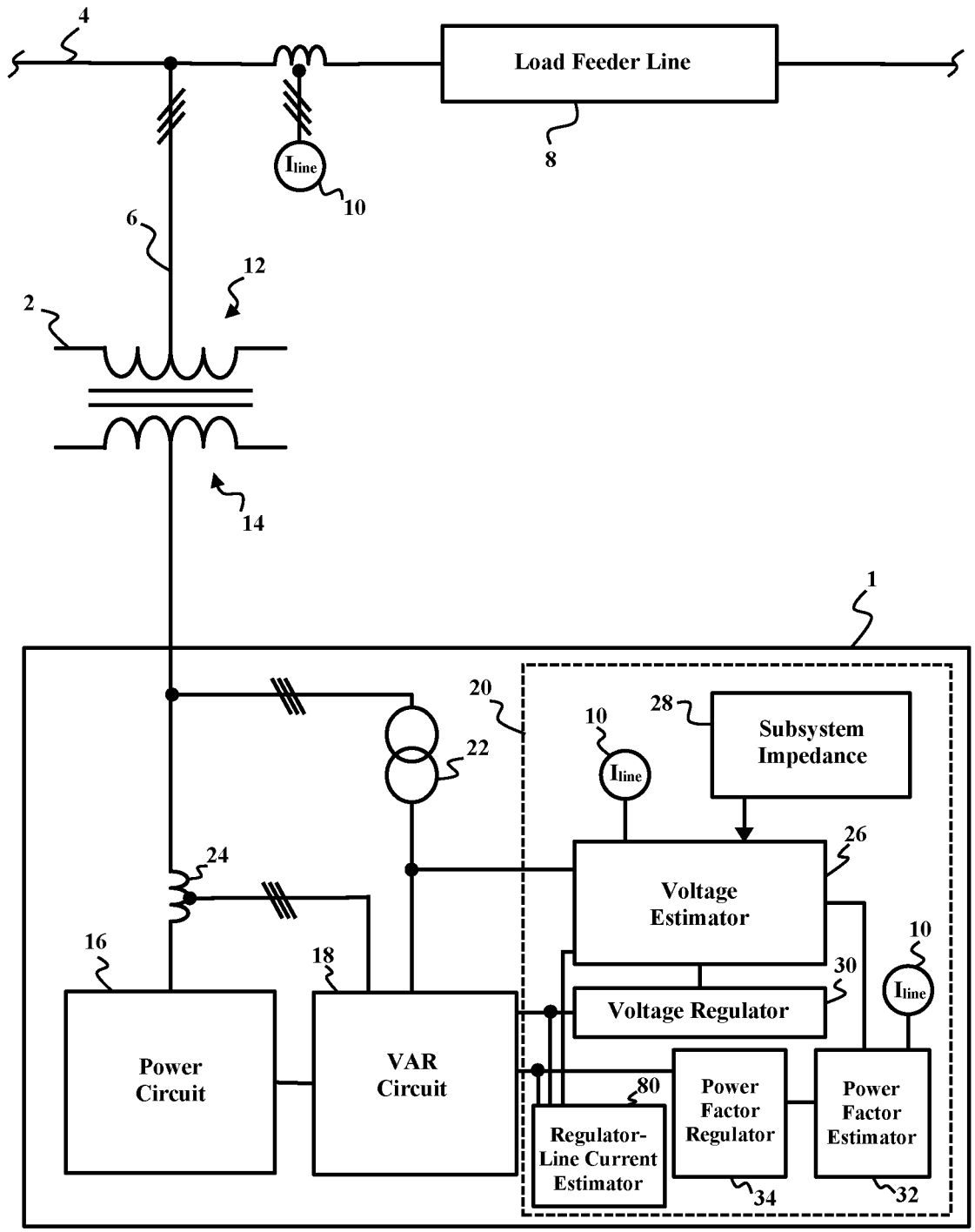
FIG. 17 is a simplified, schematic circuit diagram of a power converter with voltage waveform estimation in a utility power grid utilizing the regulator-line current estimator according to the disclosed embodiments.
Figure 18:
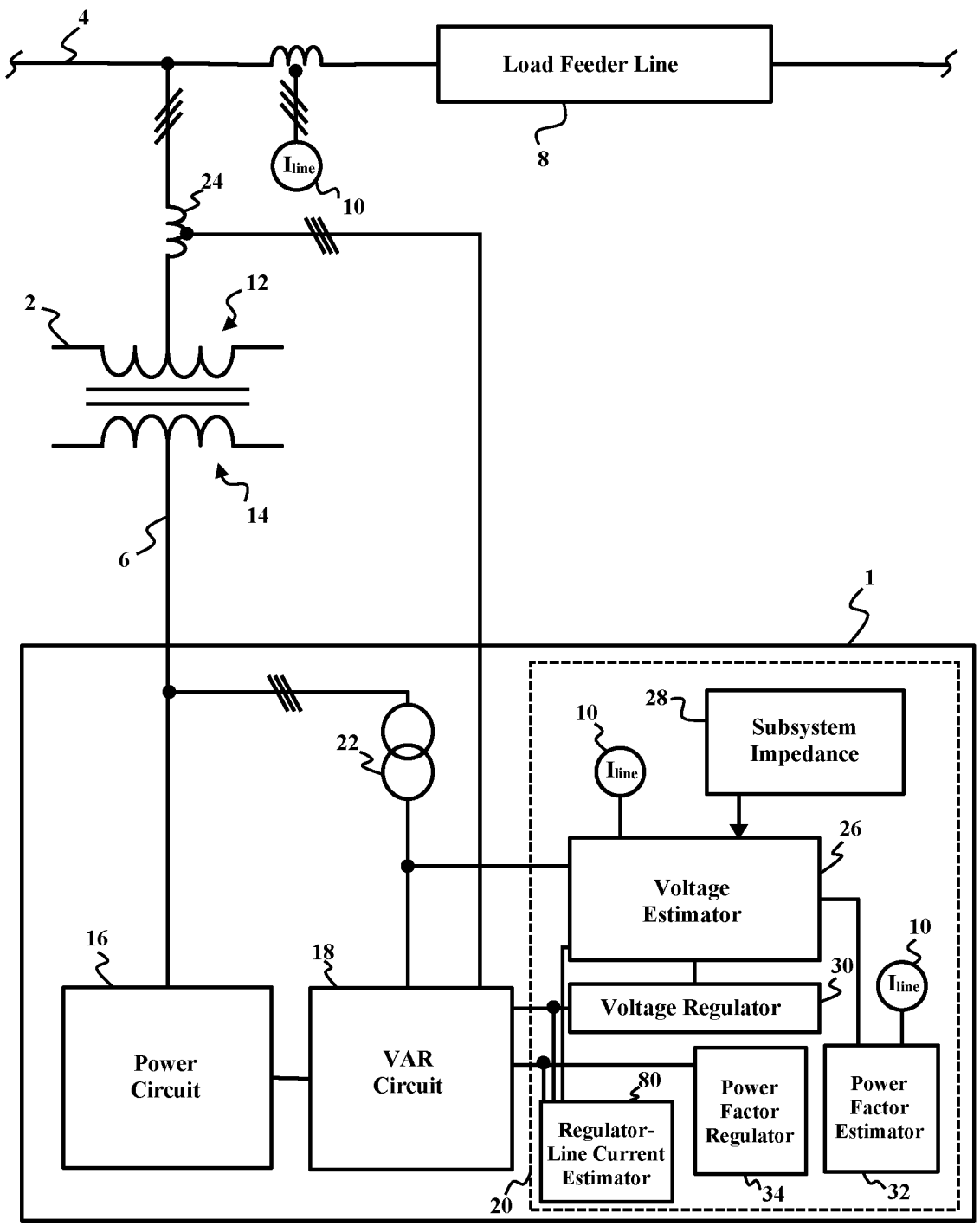
FIG. 18 is a simplified, schematic circuit diagram of a power converter with voltage waveform estimation in a utility power grid utilizing the regulator-line current estimator according to the disclosed embodiments.

FIGS. 16-18 show examples of a regulator-line current estimator 80 that estimates the regulator-line current signal from the reference signals provided by the power factor regulator 34 and the voltage regulator 30.

Figure 19:
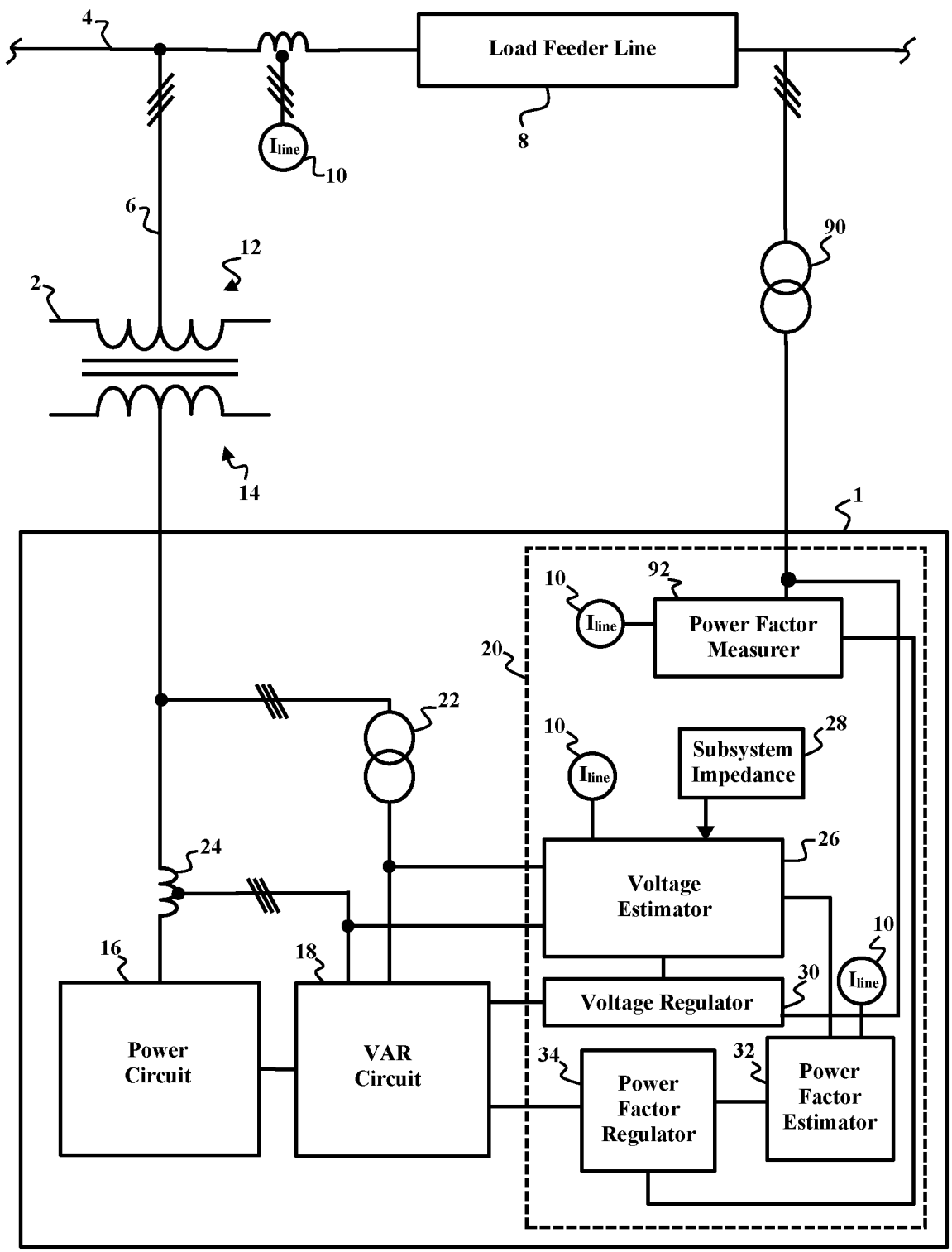
FIG. 19 is a simplified, schematic circuit diagram of a power converter with voltage waveform estimation in a utility power grid according to the disclosed embodiments.

FIG. 16 is a control diagram for the regulator-line current estimator 80. FIGS. 18 and 19 show examples of a power converter 1 that includes the regulator-line current estimator 80. FIGS. 18 and 19 correspond to FIGS. 1 and 2 with respect to the connection of the regulator-line current sensor 24. Discussion of features with similar reference numbers is not repeated.

As shown in FIGS. 18 and 19, the controller 20 of the power converter 1 includes the regulator-line current estimator 80. The inputs of the regulator-line current estimator 80 are connected to the outputs of the voltage regulator 30 and the power factor regulator 34. The output of the regulator-line current estimator 80 feeds into an input of the voltage estimator 26.

As shown in FIG. 16, the regulator-line current estimator 80 receives an input of the reactive power reference signal $Q_{ref}^*$ from the power factor regulator 34 or the voltage regulator 30 and the voltage reference signal $V_{ref}^*$. The regulator-line current estimator 80 feeds the reactive power reference signal $Q_{ref}^*$ and the voltage reference signal $V_{ref}^*$ to a loss estimator 82.

The loss estimator 82 then determines the d-component and the q-component of a regulator-line current reference signal in the dq-frame, $I_{d,ref}$ and $I_{q,ref}$. The regulator-line current estimator 80 feeds the d-component and q-component of the regulator-line current reference signal $I_{d,ref}$, $I_{q,ref}$ to a delay 84. The delay 84 outputs the d-component and the q-component of an estimated regulator-line current signal $I_{d,est}$, $I_{q,est}$. This allows the regulator-line current estimator 80 to estimate the regulator-line current signal, which represents the current supply by the power converter 1 on the regulator line 6.

The controller 20 of the power converter 1 can apply the estimated regulator-line current to estimate the primary-side line voltage signal. For example, the power converter 1 feeds the estimated regulator-line current signal $I_{d,est}$, $I_{q,est}$ from the regulator-line current estimator 80 in FIG. 16 to the voltage estimator 26. With the estimated regulator-line current signal, the voltage estimator 26 is able to estimate the primary-side line voltage signal without a physical measurement from, e.g., the regulator-line current sensor 24.

The estimated regulator-line current signal from the regulator-line current estimator 80 can be input into the voltage estimator 26 instead of the load feeder-line current signal measured by the regulator-line current sensor 24. The remainder of the signal processing remains the same as discussed above for estimation of the primary-side line voltage signal. For example, the estimated regulator-line current signal can replace the load feeder-line current signal ($I_{line}$) in the instantaneous voltage estimation of the control diagrams in FIGS. 4-6 and the RMS voltage estimation of the control diagrams in FIGS. 9-11 in one or more embodiments.

As discussed above, the power converter 1 is able to locally estimate a voltage signal on the high voltage side of the step-up transformer 2 without directly measuring the high voltage signal with, e.g., a voltage sensor (such as a potential transformer).

In some embodiments, the claimed power converter 1 could be implemented in a system that includes a voltage sensor. For example, the power converter 1 of the present disclosure may provide an alternate control system to physical high voltage measurement. Furthermore, since controller 20 of the power converter 1 can estimate the voltage in real time, the estimation of the voltage could provide better than the physical limitations of a voltage sensor. The estimation could also be used as a redundancy measure in case of sensor failure. Thus, a voltage sensor on the power supply line 4 may be included in some embodiments.

Figure 20:
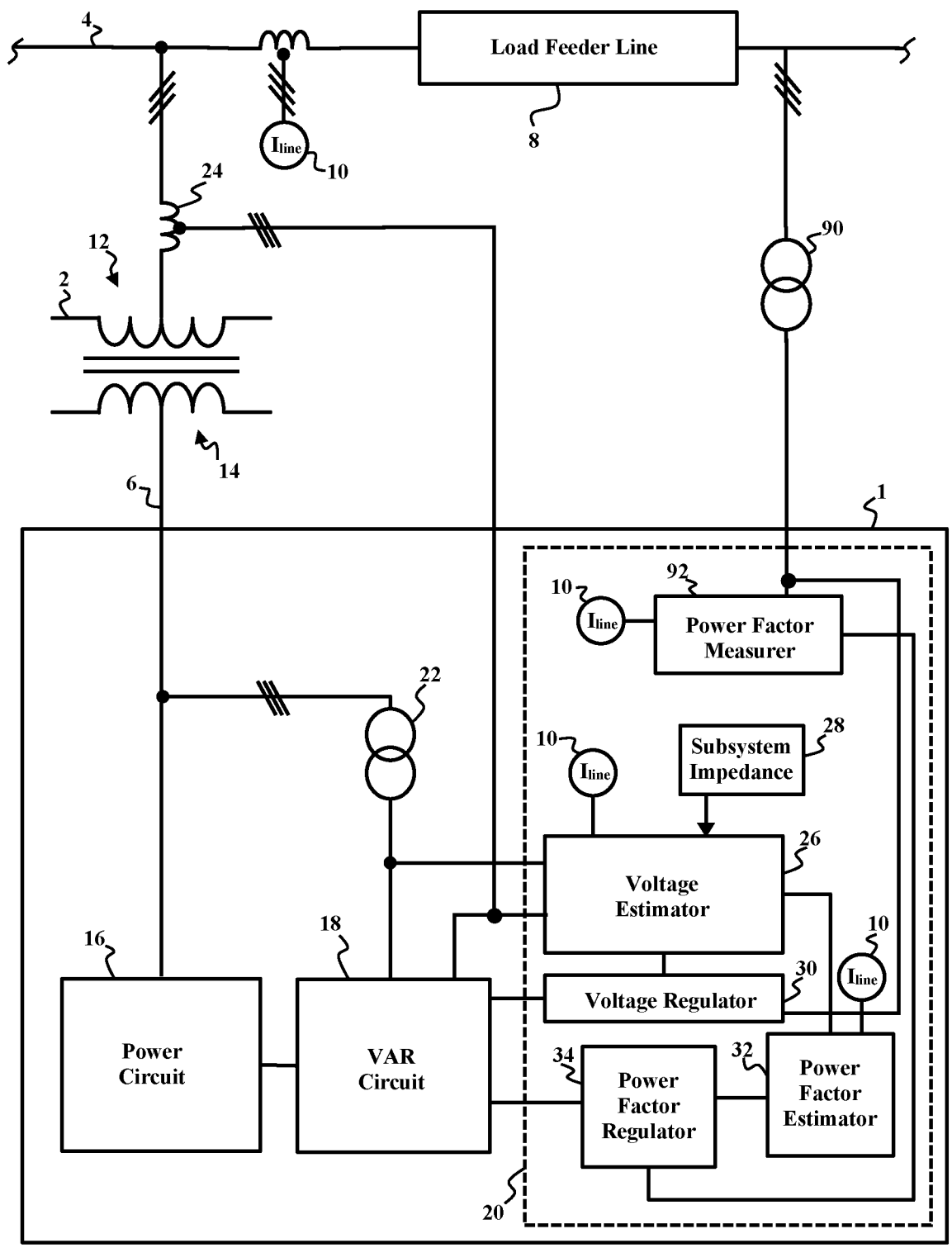
FIG. 20 is a simplified, schematic circuit diagram of a power converter with voltage waveform estimation in a utility power grid according to the disclosed embodiments.

FIGS. 19 and 20 provide examples of a utility power regulation system using local voltage estimation and method for the same. FIGS. 19 and 20 correspond to FIGS. 1 and 2, respectively with respect to the connection of the regulator-line current sensor 24. Discussion of features with similar reference numbers is not repeated.

FIGS. 19 and 20 show that the controller 20 also includes a power supply line voltage sensor 90. The power supply line voltage sensor 90 is, e.g., a potential transformer, which sends a signal to the power converter 1 representative of the high voltage signal on the power supply line 4. This high voltage signal from the power supply line 4 is estimated by the voltage estimator 26, as discussed above. However, the high voltage signal may nevertheless be provided to the power converter 1 in some embodiments.

In particular, the power supply line voltage sensor 90 is connected at a position on the power supply line 4 in FIGS. 19 and 20 such that the power supply line voltage sensor 90 provides a voltage signal representative of the voltage waveform after the load feeder line 8.

The power supply line voltage sensor 90 may also be provided before the load feeder line 8. For example, the power supply line voltage sensor 90 may be located on the power supply line 4 after the primary side 12 of the step-up transformer 2. At this position, the power supply line voltage sensor 90 will provide a voltage signal representative of the high voltage after the step-up transformer 2 and before the effects of the load feeder line 8.

As shown in FIGS. 19 and 20, the power supply line voltage sensor 90 is connected to the voltage regulator 30 and a power factor measurer 92. The voltage regulator 30 is discussed above. The power factor measurer 92 determines the power factor, reactive power, and active power from the signal voltage provided by the power supply line voltage sensor 80.

Figure 21:
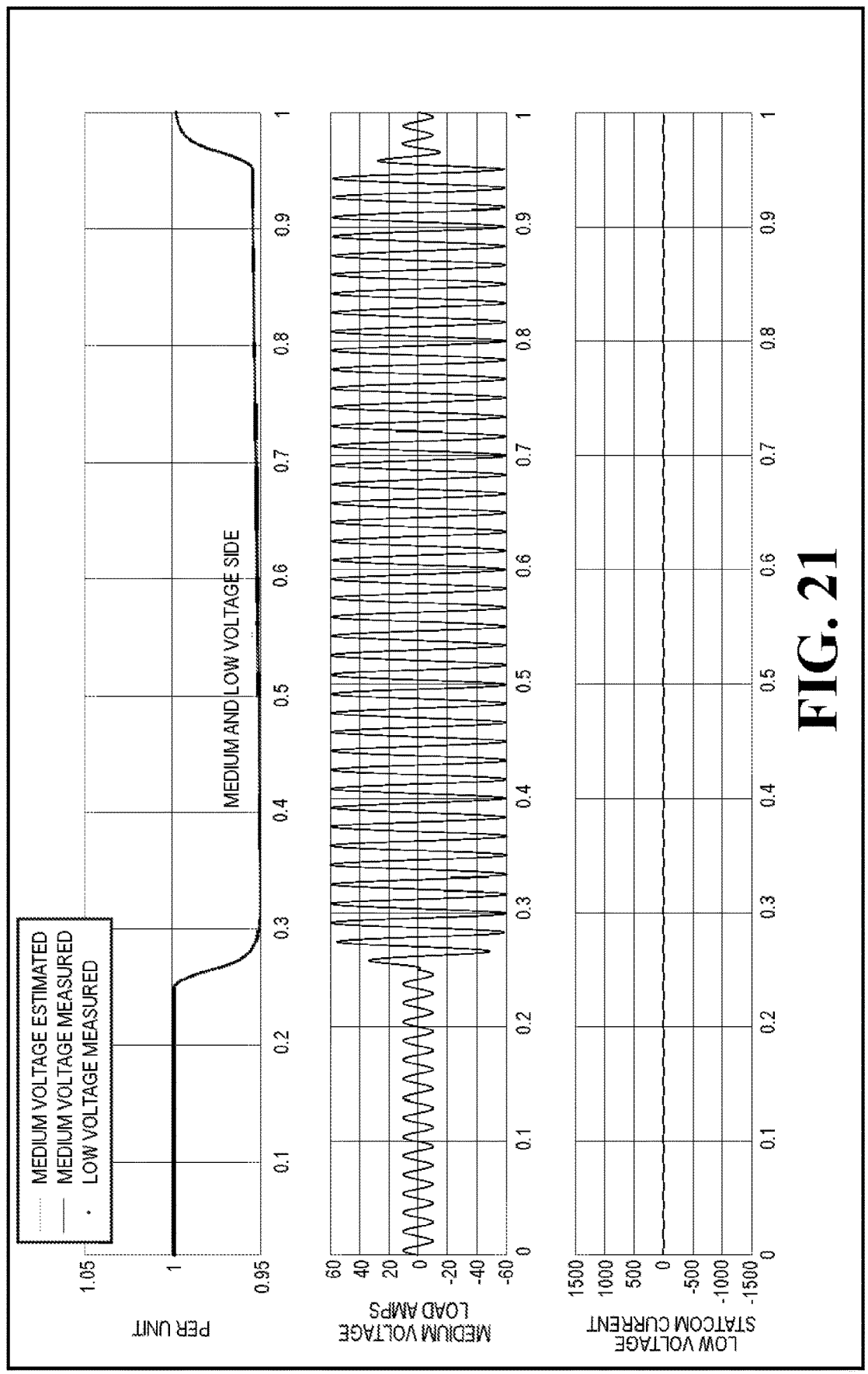
FIG. 21 is a timing plot in which voltage regulation is disabled according to disclosed embodiments.
Figure 22:
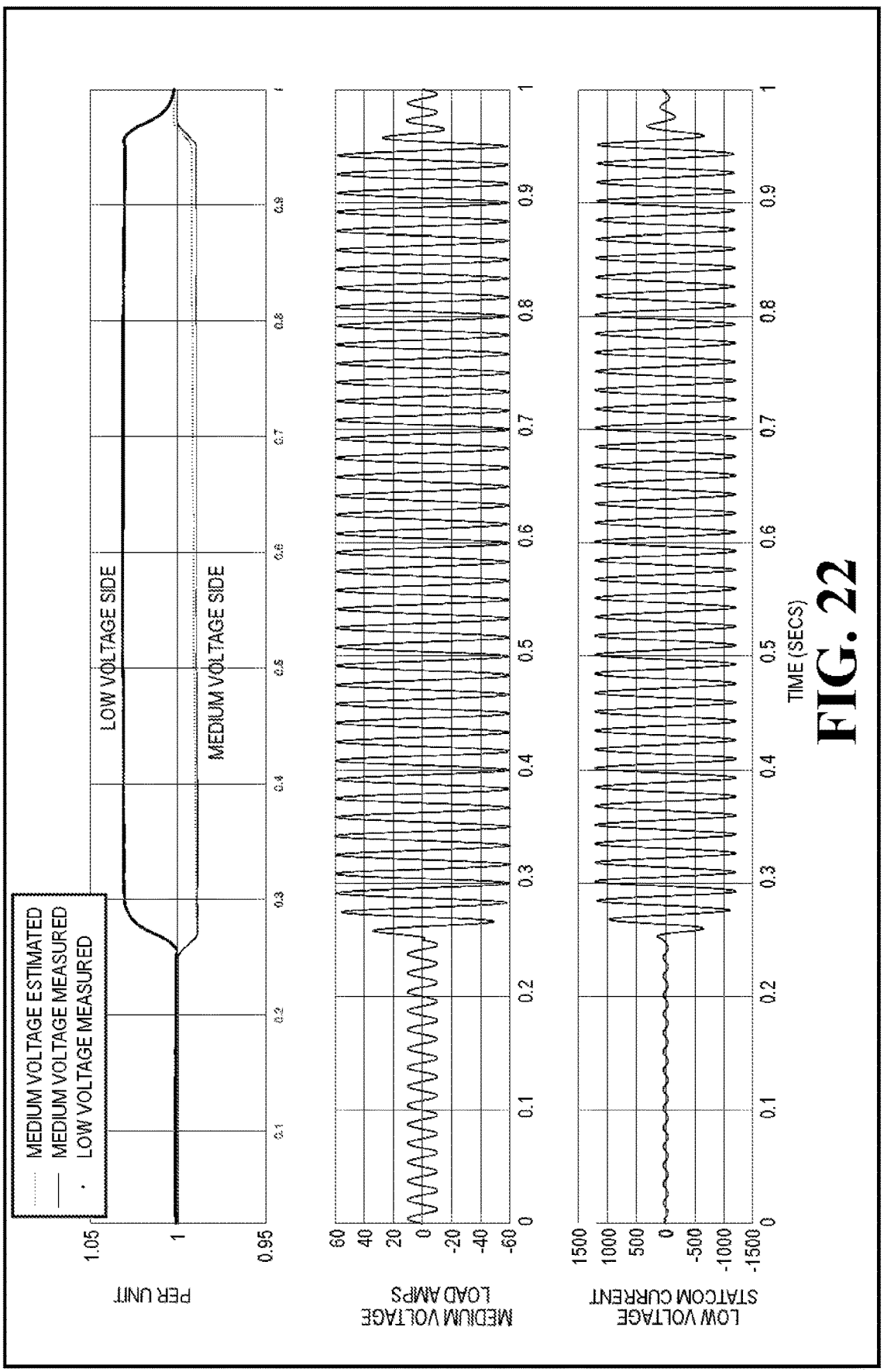
FIG. 22 is a timing plot in which voltage regulation is enabled according to disclosed embodiments.

FIGS. 21 and 22 show timing plots with the voltage regulation disabled and enabled, respectively. The voltage regulation shown in FIGS. 21 and 22 of the power converter 1 (such as a STATCOM) shows a detailed comparison of the operation of the power converter 1 with the voltage estimation of the controller 20 and with a physical voltage measurement from a voltage sensor (such as the power supply line voltage sensor 90 in FIGS. 19 and 20) for purposes of comparison.

Each of FIGS. 21 and 22 include one plot with three subplots (i.e., three graphs). The three subplots will be referred to as the top subplot, the middle subplot, and the bottom subplot as shown in the figures. The top subplot of FIGS. 21 and 22 show the voltage signal on the medium voltage side and the low voltage side of the step-up transformer 2 (i.e., connected to the primary side 12 and the secondary side 14 of the step-up transformer 2). The medium voltage side corresponds to the high voltage side discussed in the present application (e.g., 12.47 kV, 34.5 kV, 345 kV). As will be understood by one skilled in the art, the step-up transformer 2 increases (steps up) the voltage, and thus the medium voltage side connected to a primary side 12 has a higher voltage than the low voltage side (e.g., 380 V, 480 V, 600 V) connected to a secondary side 14 of a step-up transformer 2.

The middle subplot of FIGS. 21 and 22 show the current flowing through the load feeder line 8. The bottom subplot of FIGS. 21 and 22 show the current output by the power converter 1. The current output by the power converter 1 is, e.g., the regulator line current that flows through the regulator line 6, as measured by the regulator-line current sensor 24 or as estimated by the regulator-line current estimator 80.

The power converter 1 (such as STATCOM) performs voltage regulation by sending a current signal as shown in the bottom subplots of FIGS. 21 and 22 to the power supply line 4. This operation of the power converter 1 is referred to as an automatic voltage regulation function with reference to FIGS. 21 and 22.

FIG. 21 shows an example when a voltage drop occurs on the medium voltage side and the automatic voltage regulation function of the power converter 1 is off. In the middle subplot of FIG. 21, the current increases across a load at around 0.25 seconds. The load is, e.g., connected to the load feeder line 8. When the current increase occurs across the load as shown in the middle subplot of FIG. 21, a voltage drop will occur on the medium voltage side. This is shown in the top subplot of FIG. 21.

In the top subplot of FIG. 21, a voltage drop occurs due to the current increase as shown in the middle subplot of FIG. 21. Since the automatic voltage regulation function of the power converter 1 is not in operation to raise the voltage in response to a voltage drop, the voltage drops on both the medium and the low voltage side of the step-up transformer 2 in the top subplot of FIG. 21. This alignment in the voltage drop on the both medium and low voltage is shown as an overlapping signal in the top subplot of FIG. 21.

The bottom subplot of FIG. 21 shows that no change in current occurs through the power converter 1. This is because the automatic voltage regulation function is off in FIG. 21. Since the voltage regulation function is off in FIG. 21, the medium and low voltage sides will drop in direct proportion to one another.

FIG. 22 shows the operation when the automatic voltage regulation function of the power converter 1 is on (i.e., enabled). The middle subplot of FIG. 22 shows that a current increase occurs across the load similar to the middle subplot of FIG. 21. As with FIG. 21, the voltage across the medium voltage side drops. The voltage drop on the medium voltage side in shown in the top subplot of FIG. 22. Unlike FIG. 21, when voltage drop occurs across the medium voltage side, the power converter 1 will perform voltage regulation to compensate for the voltage drop.

As shown in the bottom subplot of FIG. 22, the power converter 1 outputs a current signal. The current signal causes the voltage on the low voltage side in the top subplot of FIG. 19 to increase to compensate for the voltage drop on the medium voltage side. In other words, this allows the power converter 1 to compensate for the voltage drop that would have otherwise occurred persistently across the medium voltage side.

The top subplot of FIG. 22 demonstrates the high level of accuracy of the claimed estimation method in the performance of this regulation. Note that the top subplot shows the three voltage signals, as shown in the legend in the top subplot of FIG. 22. First, the top subplot of FIG. 22 shows a measured voltage signal on the medium voltage side (e.g., by the power supply line voltage sensor 90, such as a potential transformer) as a thin, solid line. Second, the top subplot of FIG. 22 shows an estimated voltage signal by the voltage estimator 26 of the controller 1 in the power converter 1. The estimated voltage is shown as a fine dotted line in the top subplot of FIG. 22. Third, the top subplot of FIG. 22 shows the measured voltage on the low voltage side (e.g., by the secondary-side voltage sensor 22) as a bold line.

The estimated voltage in the fine dotted line and the measured voltage in the thin solid line demonstrate the high level of accuracy of the voltage estimator 26. As seen in the top subplot of FIG. 22, the estimated voltage signal closely tracks (correlates with) the measured voltage signal. The correlation is strong enough that the difference between the estimated voltage signal and the measured voltage signal can be considered negligible for purposes of regulation. For example, the top and bottom subplots shows the power converter 1 is able to compensate for the voltage drop that occurs on the medium voltage side without measuring the actual voltage drop.

Figure 23:
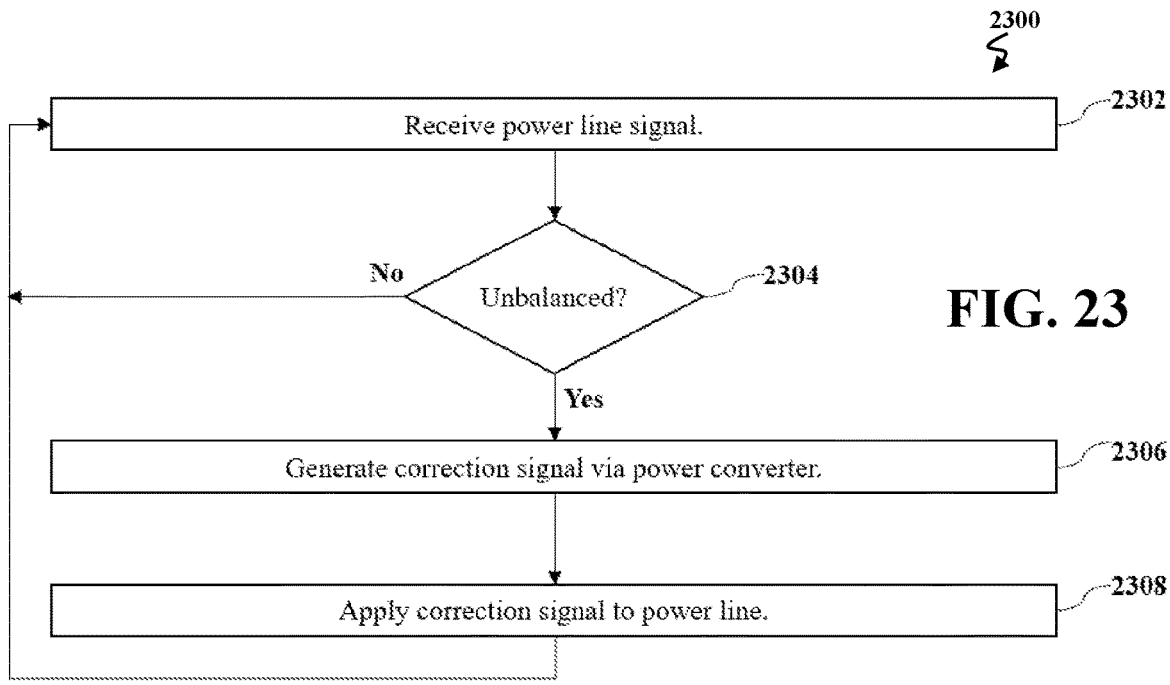
FIG. 23 is a flow chart showing a power converter regulation operation according to disclosed embodiments.
Figure 24:
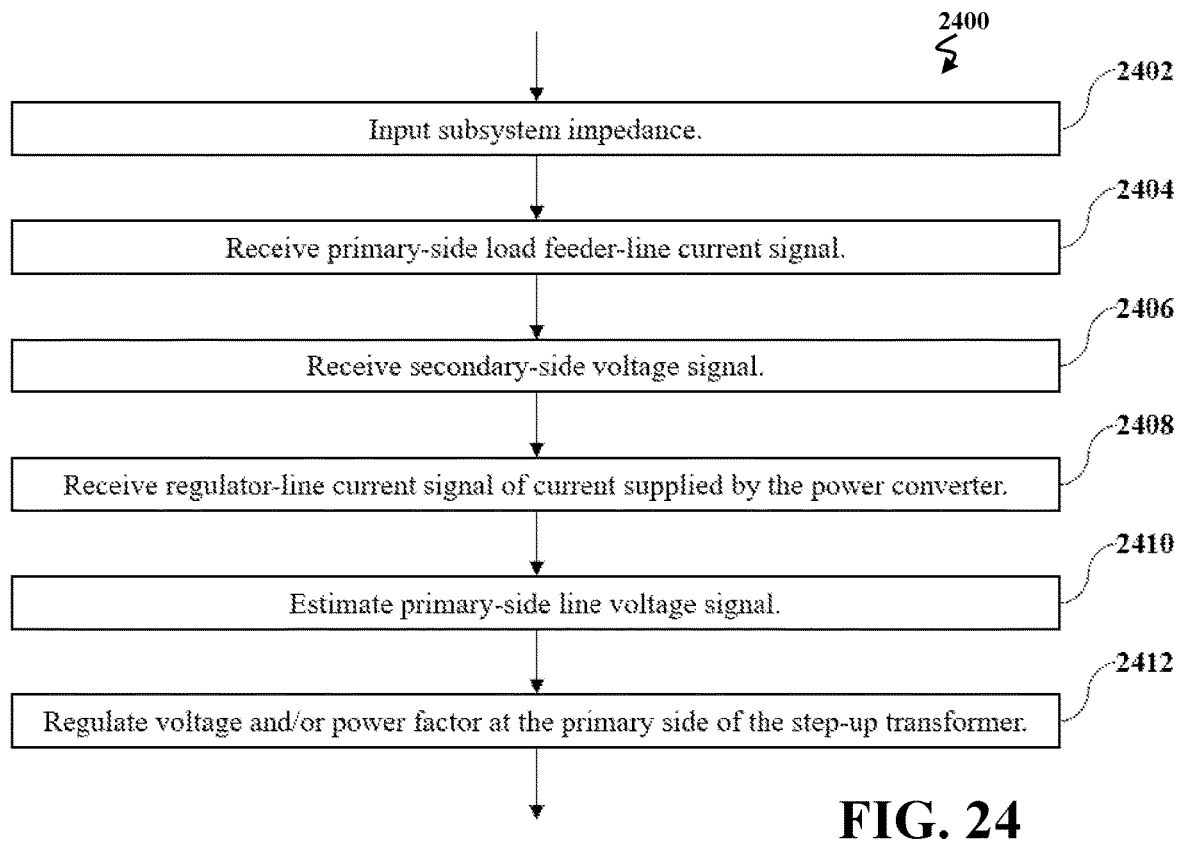
FIG. 24 is a flow chart showing a power converter regulation operation with voltage estimation and regulation according to disclosed embodiments.
Figure 25:
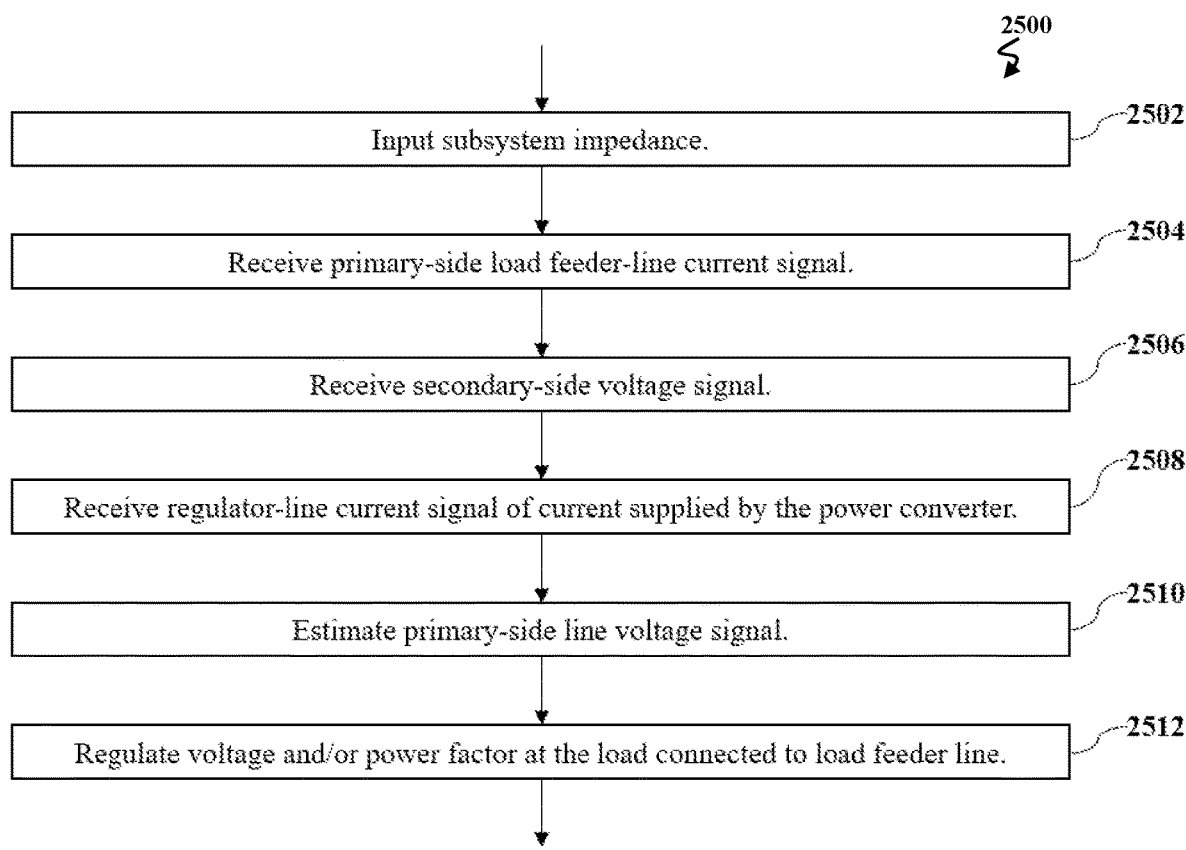
FIG. 25 is a flow chart showing a power converter regulation operation with power factor estimation and regulation according to disclosed embodiments.

FIGS. 23-25 show a method of operation for regulation of a power supply line 4 on a high voltage side of a step-up transformer 2 with local voltage estimation. The method of operation is discussed in detail above with respect to FIGS. 1-22. An additional, simplified explanation of the operation is provided in the flowcharts shown in FIGS. 23-25.

FIG. 23 provides a first flowchart 2300 that shows a general overview of regulation of the power supply line 4 using a power converter 1. FIG. 24 shows a second flowchart 2400 that demonstrates regulation of the high voltage side on the primary side 12 of a step-up transformer 2 based on local voltage estimation within the power converter 1. FIG. 25 shows a third flowchart 2500 that demonstrates regulation of the high voltage side at a load connected to the load feeder line 8.

As shown in FIG. 23, the power converter 1 receives a power line signal of the power supply line 4 in step 2302 of the first flowchart 2300. The power converter 1 determines at step 2304 whether AC voltage on the power supply line 4 needs to be rebalanced (adjusted). For example, an unbalanced signal can be seen in the middle subplots of FIGS. 21 and 22 discussed above.

The determination in the decision node in step 2304 can be made by the controller 20 or a hardware circuit, such as a feedback circuit. If the power converter 1 determines that no correction is required (i.e., "no" at step 2304), then the operation returns to step 2302. Although the first flowchart 2300 shows a return to step 2302 in which the power line signal is received, the return loop may return to the point in the first flowchart 2300 after step 2302 and before the decision node at step 2304.

If the power converter 1 determines that the AC voltage on the power supply line 4 needs to be adjusted (i.e., "yes" at step 2304), then the operation proceeds to step 2306. In step 2306, the power converter 1 generates a correction signal to adjust the AC voltage on the power supply line 4. Next, the power converter 1 supplies the correction signal to the power supply line 4 via the regulator line 6 in step 2308. An example of the correction signal can be seen in the bottom subplot of FIG. 22.

After supplying the correction signal, the operation returns to step 2302 and the operation repeats. Although the first flowchart 2300 shows the return loop from step 2308 as returning to step 2302, the return loop from step 2308 may alternatively return to the point in the first flowchart 2300 after step 2302 and before the decision node in step 2304.

FIGS. 24 and 25 show a second flowchart 2400 and a third flowchart 2500 that show operation involved in estimating a primary-side line voltage signal that represents the high voltage on the power supply line 4. As discussed above in greater detail, the regulation of the power supply line 4 in the disclosed embodiments uses local voltage estimating. This avoids the problems associated with physical measurement of the voltage signal on the power supply line 4 (e.g., by a power supply line voltage sensor 80, such as a potential transformer).

The operation in the second flowchart 2400 of FIG. 24 begins with a step 2402 of inputting a subsystem impedance 28. In FIG. 24, the regulation will be based on the primary side 12 of the step-up transformer 2. Hence, the subsystem impedance 28 in step 2402 is the impedance of the step-up transformer 2. That is, the impedance of the step-up transformer 2 as caused by the power converter 1. As will be discussed with reference to FIG. 25 below, the subsystem impedance 28 could also include the impedance of the load feeder line 8 in addition to the impedance of the step-up transformer 2.

The second flowchart 2400 then proceeds to step 2404 in which the power converter 1 (e.g., the controller 20) receives a primary-side load feeder line current signal from the load feeder line current sensor 10. In step 2406, the power converter 1 receives a secondary-side voltage signal from a secondary-side voltage sensor 22 (such as a potential transformer). In step 2408, the power converter 1 receives a regulator-line current signal that represents the current supplied by the power converter 1 along the regulator line 6.

In the receiving of the regulator-line current signal in step 2408, the regulator-line current signal may be measured by the regulator-line current sensor 24 or estimated by the regulator-line current estimator 80. Although steps 2402-2408 are shown separately in FIG. 24, these steps can be performed in any order or simultaneously.

After the power converter 1 receives the subsystem impedance, the primary-side load feeder line current signal, the secondary-side voltage signal, and the regulator-line current signal, the controller 20 of the power converter 1 estimates a primary-side line voltage signal in step 2410. The primary-side voltage signal represents the power line voltage on the high voltage side of the step-up converter 2 (i.e., connected to the primary side 12 of the step-up transformer 2).

An example of the primary-side voltage signal estimated by the controller 20 of the power converter 1 in step 2410 can be seen in, e.g., the fine dotted line in the top subplot of FIG. 22, which is discussed above. Furthermore, the control diagrams provided in FIGS. 4 and 9 show a detailed representation of the estimation process in step 2410.

Next, the second flowchart 2400 proceeds to step 2412. In step 2412, the power converter 1 uses the primary-side voltage signal estimated in step 2410 to regulate the voltage and/or power factor at the primary side 12 of the step-up transformer 2 in step 2412. An example of voltage regulation and power factor regulation can be seen in the control diagrams of the voltage regulator 20 in FIG. 14 and the power factor regulator 34 in FIG. 15, respectively.

FIG. 25 shows a third flowchart 2500 with similar steps of the second flowchart 2400 of FIG. 24. Differences between the third flowchart 2500 and the second flowchart 2400 will be discussed below. However, similar steps between the second flowchart 2400 and the third flowchart 2500 are not repeated in detail.

In the third flowchart 2500, the point of regulation is at the load connected to the load feeder line 8. Whereas, the point of regulation in the second flowchart 2400 of FIG. 24 is at the primary side 12 of the step-up transformer. In view of this, the subsystem impedance 28 input in step 2502 is different than the subsystem impedance of step 2402. In step 2502, the subsystem impedance is the impedance of both the step-up transformer 2 and the load feeder line 8.

In step 2504, the power converter 1 receives the primary-side load feeder-line current in a similar manner as step 2404. In step 2506, the power converter 1 receives a secondary-side voltage signal in a similar manner as step 2406. In step 2508, the power converter 1 receives a regulator-line current signal in a similar manner as step 2408.

Although steps 2502-2208 occur separately in the third flowchart 2500 of FIG. 25, these steps can occur in any order or simultaneously.

After the power converter 1 receives the subsystem impedance of the step-up transformer 2 and the load feeder line 8, the primary-side load feeder-line current signal, the secondary-side voltage signal, and the regulator-line current signal, the controller 20 of the power converter 1 estimates a primary-side line voltage signal in step 2510, which represents a high voltage signal on the power supply line 4 after the load feeder line 8. The estimation by the controller 20 is similar to the estimation in step 2410.

After estimating the primary-side line voltage, the third flowchart 2500 proceeds to step 2512. In step 2512, the power converter 1 regulates the voltage and/or the power factor at the load connected to the load feeder line 8. The regulation in step 2512 is similar to the regulation that occurs at step 2412 of FIG. 24.

The above disclosed system relates to a utility power regulation system using local voltage estimation and method for the same. Using local voltage estimation of the high voltage side of the step-up transformer 2 allows may advantageously allow reduction or elimination of voltage sensors and long distance cabling during utility power grid regulation along with the problems associated therewith discussed above.

As will be understood by one skilled in the art, the utility power regulation system using local voltage estimation and method may include one or more of each of the components discussed above. Furthermore, the system and method may include, or be performed by, one or more controllers 20.

The controller 20 discussed above may include one or more processors and memory. The controller 20 may be, or include, e.g., a microcontroller, a microcomputer, a programmable logic controller (PLC), an industrial computer, or a digital signal processor. The memory can include static memory (e.g., ROM, PROM, EPROM), dynamic memory (e.g., RAM, SRAM, DRAM), and/or hybrid memory (e.g., NVRAM, EEPROM, Flash) that holds information used by the controller 20. The memory of the controller 20 can include one or more programs for operating the components of the system and method, data used by the controller 20, and/or technical information used by the controller 20. In various embodiments, the memory of the controller 20 may include, or be, a flash drive, a solid-state drive, a magnetic or optical drive, or any suitable memory device.

The method of the utility power regulation system using local voltage estimation and method of the present disclosure may be a computer-implemented method. Furthermore, the utility power regulation system using local voltage estimation and method may utilize one or more computer-readable storage media to implement embodiments consistent with the present disclosure. A computer-readable storage medium refers to any type of physical memory on which information or data readable by a processor may be stored. Computer-readable storage medium may store instructions for execution by one or more processors, including instructions for causing one or more of the processors to perform steps or stages consistent with the disclosed embodiments. The term "computer-readable medium" should be understood to include tangible items and exclude carrier waves and transient signals (i.e., be non-transitory).

This disclosure is intended to explain how to fashion and use various embodiments in accordance with, not limit, the true, intended, and fair scope and spirit thereof. The foregoing description is not intended to be exhaustive, or limited to, the precise form disclosed. Modifications or variations are possible in light of the above teachings. The embodiments above are chosen and described to provide illustration of the principles as practical applications, and to enable one of ordinary skill in the art to utilize the various embodiments and with various modifications as are suited to the particular use contemplated. All such modifications and variations are within the scope of the disclosure as determined by the claims, and all equivalents thereof, when interpreted in accordance with the breadth to which they are fairly, legally, and equitably entitled.

What is claimed:

1. A method for regulating utility power, comprising:
receiving, from a primary-side load feeder-line current sensor, a load feeder-line current signal representative of current on a load feeder line electrically connected to a primary side of a transformer;
receiving, via a secondary-side voltage sensor, a secondary-side voltage signal on a secondary side of the transformer;
receiving a regulator-line current signal representative of current on a power regulator line supplied by a power converter electrically connected to the secondary side of the transformer;
estimating a primary-side line voltage signal on a power line at the primary side of the transformer or at a load fed through the load feeder line based on a subsystem impedance, the secondary-side voltage signal at the power converter, the load feeder-line current signal, and the regulator-line current signal of the current supplied by the power converter; and
regulating, via the power converter, one or more of a power line voltage and a power factor on the power line at the primary side of the transformer, or at the load that is electrically connected to the load feeder line, based on the primary-side line voltage signal.

2. The method according to claim 1, wherein
the estimating of the primary side line voltage signal occurs without measuring the power line voltage on the power line at the primary side of the transformer, or at the load that is electrically connected to the load feeder line.

3. The method according to claim 1, wherein
the subsystem impedance is an impedance of the transformer or an impedance of a combination of the transformer and the load-feeder line.

4. The method according to claim 1, wherein
the regulator-line current signal is measured by a regulator-line current sensor that is connected to the power regulator line on the primary side or the secondary side of the transformer.

5. The method according to claim 1, wherein
the regulator-line current signal is estimated from a regulator reference signal.

6. The method according to claim 1, further comprising
generating, via a phase-locked loop, a frequency and an angle of the power line voltage from the secondary side voltage signal.

7. The method according to claim 6, wherein
the estimating of the primary-side line voltage signal estimates an instantaneous magnitude, angle, and power factor signal of each phase of the power line voltage.

8. The method according to claim 7, wherein
the regulating of the power line outputs a signal that regulates an instantaneous magnitude, angle, and power factor of each phase of the power line voltage on the primary side of the transformer.

9. The method according to claim 6, wherein
the estimating of the primary-side line voltage signal on the primary side of the transformer generates a root-mean-square voltage signal, phase angle, and power factor signal of each phase of the power line voltage.

10. The method according to claim 9, further comprising
regulating, via the power converter, the root-mean-square voltage magnitude and power factor of the power line voltage.

11. A utility power regulation system, comprising:
a power converter configured to regulate AC voltage on a power line that is connected to a primary side of a transformer via a power regulator line, the power converter is electrically connected to a secondary side of the transformer via the power regulator line;
a secondary-side voltage sensor electrically connected to the power regulator line on the secondary side of the transformer, the secondary-side voltage sensor configured to measure a secondary-side voltage signal on the secondary side of the transformer at the power converter;
a primary-side load feeder-line current sensor that is electrically connected to a load feeder-line and that measures a load feeder-line current signal representative of current on the load feeder-line connected to the power line; and a voltage estimation circuit configured to estimate a primary-side line voltage signal on the power line at the primary side of the transformer or at a load fed through the load feeder line based on a subsystem impedance, the secondary-side voltage signal at the power converter, the load power feeder-line current signal, and a regulator-line current signal representative of the current supplied by the power converter, wherein the power converter is configured to regulate one or more of a voltage and a power factor at the primary side of the transformer or at a load electrically connected to the load feeder line based on the primary-side line voltage signal estimated by the voltage estimation circuit.

12. The utility power regulation system according to claim 11, wherein the voltage estimation circuit is further configured to estimate the primary-side line voltage signal without measuring a power line voltage on the primary side of the transformer or at the load electrically connected to the load feeder line.

13. The utility power regulation system according to claim 11, wherein the subsystem impedance is an impedance of the transformer or a combination of the transformer and the load-feeder line.

14. The utility power regulation system according to claim 11, further comprising a regulator-line current sensor that is electrically connected to the power regulator line on the primary side or the secondary side of the transformer and that measures the regulator-line current signal.

15. The utility power regulation system according to claim 11, further comprising a regulator-line current estimation circuit that estimates the regulator-line current signal from a regulator reference signal.

16. The utility power regulation system according to claim 11, further comprising:

a phase-locked loop that is located within the power converter, that is electrically connected to the power regulator line, and that estimates a frequency and an angle of the of the primary-side power line voltage on the primary side of the transformer from the secondary side voltage signal.

17. The utility power regulation system according to claim 16, wherein the voltage estimation circuit is further configured to estimate an instantaneous magnitude, angle, and power factor signal of each phase of the primary side line voltage.

18. The utility power regulation system according to claim 16, wherein the power converter is further configured to regulate the instantaneous magnitude, angle, and the power factor signal of each phase of the line voltage on the primary side of the transformer.

19. The utility power regulation system according to claim 16, wherein the voltage estimation circuit is further configured to generate a root-mean-square voltage signal, angle, and power factor signal of each phase of the primary side line voltage.

20. The utility power regulation system according to claim 18, wherein the power converter is further configured to regulate the root-mean-square voltage magnitude and power factor of the power line.

* * * * *